US011681433B2

(12) United States Patent
Kobayashi et al.

(10) Patent No.: US 11,681,433 B2
(45) Date of Patent: Jun. 20, 2023

(54) DISPLAY SYSTEM, CONTROLLER, DISPLAY SYSTEM CONTROL METHOD, AND PROGRAM FOR RECEIVING INPUT CORRESPONDING TO IMAGE DISPLAYED BASED ON HEAD MOVEMENT

(71) Applicant: SEIKO EPSON CORPORATION, Tokyo (JP)

(72) Inventors: Shinichi Kobayashi, Chino (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/161,857

(22) Filed: Jan. 29, 2021

(65) Prior Publication Data
US 2021/0240343 A1 Aug. 5, 2021

(30) Foreign Application Priority Data
Jan. 30, 2020 (JP) .............................. JP2020-013125

(51) Int. Cl.
G06F 3/04886 (2022.01)
G02B 27/01 (2006.01)
G06F 3/04842 (2022.01)
G06F 3/14 (2006.01)
G02B 27/00 (2006.01)
H04M 1/72409 (2021.01)

(52) U.S. Cl.
CPC ..... G06F 3/04886 (2013.01); G02B 27/0093 (2013.01); G02B 27/017 (2013.01); G06F 3/04842 (2013.01); G06F 3/1446 (2013.01); H04M 1/724097 (2022.02)

(58) Field of Classification Search
CPC .................................................. G06F 3/04886
See application file for complete search history.

(56) References Cited

U.S. PATENT DOCUMENTS

2009/0048021 A1* 2/2009 Lian .................. G06F 3/011 463/37
2012/0064951 A1* 3/2012 Agevik ............... H04M 1/6066 455/569.1
2013/0265221 A1* 10/2013 Lee .................. H04N 21/41265 345/156

(Continued)

FOREIGN PATENT DOCUMENTS

JP 2019-036914 A 3/2019

Primary Examiner — William Boddie
Assistant Examiner — Andrew B Schnirel
(74) Attorney, Agent, or Firm — Oliff PLC

(57) ABSTRACT

A method for controlling a display system including a head-mounted display device and a controller coupled to the display device is provided. A first display unit provided in the display device constituting the display system enables an outside scene to be visually recognized. The first display unit is caused to perform display in any mode of a plurality of modes in accordance with a state of the head of a user wearing the display device. At this time, one input mode of a plurality of input modes is set in accordance with a display mode of the first display unit, and input corresponding to each of the plurality of input modes is enabled in coordination with display on a second display unit provided in the controller, and input is received in the input mode.

9 Claims, 17 Drawing Sheets

(56) References Cited

U.S. PATENT DOCUMENTS

| | | | |
|---|---|---|---|
| 2016/0062457 A1* | 3/2016 | Kobayashi | G06F 1/163 |
| | | | 345/156 |
| 2016/0085403 A1* | 3/2016 | Koga | G06F 3/04842 |
| | | | 345/684 |
| 2018/0176547 A1* | 6/2018 | Kobayashi | H04N 13/332 |
| 2019/0056813 A1 | 2/2019 | Fukuda et al. | |
| 2019/0146222 A1* | 5/2019 | Hiroi | G06F 3/012 |
| | | | 345/8 |
| 2021/0239988 A1* | 8/2021 | Kobayashi | G06F 3/012 |

* cited by examiner

| MOVEMENT OF HEAD | DISPLAY AND INPUT ASPECT | | |
|---|---|---|---|
| | NAME | FIRST DISPLAY UNIT | SECOND DISPLAY UNIT |
| FIRST MOVEMENT 40 DEGREES OR MORE TO RIGHT | FIRST DISPLAY PROCESSING | DYNAMIC IMAGE DISPLAY | REMOTE CONTROLLER DISPLAY |
| SECOND MOVEMENT 40 DEGREES OR MORE TO LEFT | SECOND DISPLAY PROCESSING | GAME 1 DISPLAY | GAMING PAD DISPLAY |
| THIRD MOVEMENT 15 DEGREES OR MORE DOWNWARD | THIRD DISPLAY PROCESSING | APP SELECTION SCREEN DISPLAY | COMPOSITE INPUT PAD DISPLAY |

FIG. 5A

DISPLAY SYSTEM, CONTROLLER, DISPLAY SYSTEM CONTROL METHOD, AND PROGRAM FOR RECEIVING INPUT CORRESPONDING TO IMAGE DISPLAYED BASED ON HEAD MOVEMENT

The present application is based on, and claims priority from JP Application Serial Number 2020-013125, filed Jan. 30, 2020, the disclosure of which is hereby incorporated by reference herein in its entirety.

BACKGROUND

1. Technical Field

The present disclosure relates to a technique for implementing a display system including a display device and a controller.

2. Related Art

A head-mounted display device that is worn on the head of a user, transmits an outside scene such that it is able to be visually recognized, and also allows various displays to be superimposed on the outside scene has been proposed. In such a display device, a portion of a display image of an information processing device such as a computer is displayed as introduced in JP-A-2019-036914. With such a display device, coordination between the information processing device and the display device, improvement in work efficiency, and the like can be achieved.

However, even though such a display device enables a portion of an image of the information processing device to be visually recognized, when it is attempted to perform certain inputs something on the displayed information, it may after all be required to perform an operation by looking at an information processing terminal.

SUMMARY

The present disclosure can be realized as the following forms or application examples.

(1) A first embodiment of the present disclosure is a form of a display system including a head-mounted display device and a controller coupled to the display device. In the display system, the display device includes a first display unit configured to enable an outside scene to be visually recognized, and a display control unit configured to cause the first display unit to perform display in any mode of a plurality of modes in accordance with a state of the head of a user wearing the display device, and the controller includes a second display unit, an input unit configured to enable input in a plurality of input modes in coordination with display on the second display unit, and an input control unit configured to set an input mode of the input unit in accordance with a display mode of the first display unit.

(2) In addition, another embodiment of the present disclosure is in the form of a controller coupled to a head-mounted display device. The controller includes an input display unit configured to provide different display modes depending on input modes, an input unit configured to allow input in a plurality of input modes in combination with display on the input display unit, and an input control unit that is a transmissive display unit that enables an outside scene to be visually recognized and configured to set an input mode of the input unit in accordance with a display mode of the transmissive display unit provided in the display device.

(3) Another embodiment of the present disclosure may be a method for controlling a display system including a head-mounted display device and a controller coupled to the display device. In the method for controlling the display system, a first display unit provided in the display device that is a first display unit configured to enable an outside scene to be visually recognized is caused to perform display in any mode among a plurality of modes in accordance with a state of the head of a user wearing the display device, an input mode among the plurality of input modes is set in accordance with the display mode of the first display unit, and input corresponding to each of the plurality of input modes is possible in coordination with display on a second display unit provided in the controller, and input is received in the input mode.

(4) Another embodiment of the present disclosure is a program that can be executed by a computer to control a display system including a head-mounted display device and a controller coupled to the display device. The program realizes a function to cause a first display unit configured to enable an outside scene to be visually recognized to perform display in any mode of a plurality of modes in accordance with a state of the head of a user wearing the display device, a function of enabling input in a plurality of input modes in coordination with display on a second display unit provided in the controller, and a function of setting an input mode of the input unit in accordance with the display mode of the first display unit.

BRIEF DESCRIPTION OF THE DRAWINGS

FIG. 5A is an explanatory diagram illustrating a relationship between movements of the head and display of the first and second display units.

DESCRIPTION OF EXEMPLARY EMBODIMENTS

A. First Embodiment

Figure 1:
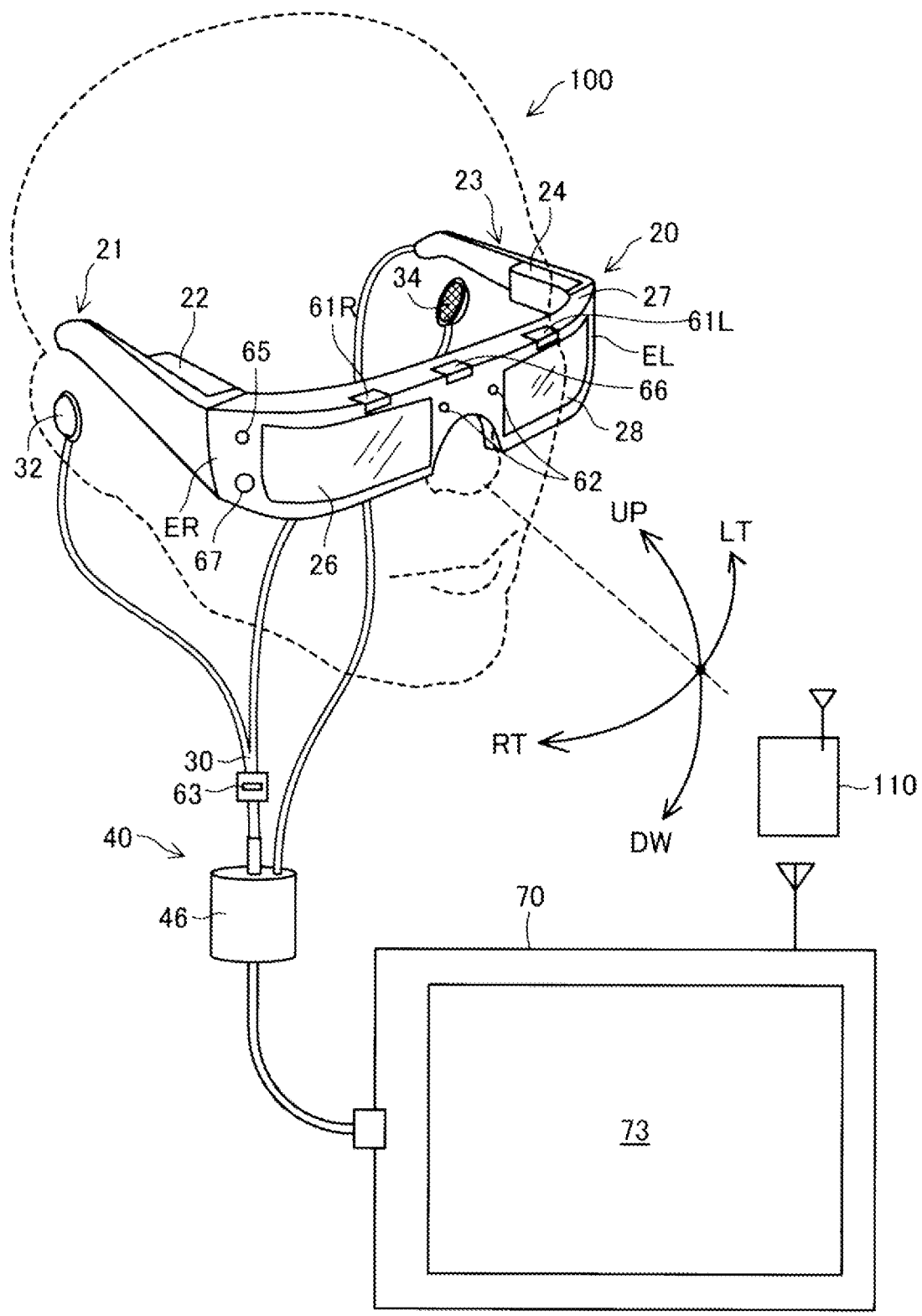
FIG. 1 is an explanatory view illustrating an appearance configuration of an HMD as a display system according to an embodiment.

A-1. Overall Configuration of HMD:

FIG. 1 is a diagram illustrating an appearance configuration of a head-mounted display (HMD) 100 as a display system according to a first embodiment. The HMD 100 is a display system including an image display unit 20 serving as a display device configured to enable a user wearing the HMD around his or her head to visually recognize virtual images and a control device 70 serving as a controller configured to control the image display unit 20. The image display unit 20 is equipped with various sensors, and the like in addition to image display, and thus the portion of the image display unit 20 particularly responsible for displaying images is referred to as a first display unit. The first display unit will be described later. Meanwhile, the control device 70 is a controller configured to perform processing necessary to exchange signals with the image display unit 20, to read values of the sensors and to cause the image display unit 20 to display images. The control device 70 includes a display having a touch panel function. This display will be referred to as a second display unit 73. A configuration of the second display unit 73 will be described later.

The control device 70 serves as an input unit, an input control unit, a setting unit, and a display control unit as will be described below. In the HMD 100, the control device 70 receives a video (including audio) transmitted from a mobile terminal 110, such as a smartphone, and outputs the video to the image display unit 20 in wireless communication, to cause the image display unit 20 to display the image (including the moving image) and play back the audio.

The image display unit 20 is a wearable body to be worn around the head of a user and has an eyeglasses shape in this embodiment. The image display unit 20 includes a main body including a right holding part 21, a left holding part 23, and a front frame 27, and includes a right display unit 22, a left display unit 24, a right light-guiding plate 26, and a left light-guiding plate 28 in the main body.

The right holding part 21 and the left holding part 23 respectively extend rearward from both ends of the front frame 27 to hold the image display unit 20 on the head of the user, like the temples of eyeglasses. Here, one of the ends of the front frame 27 located on the right side of the user wearing the image display unit 20 is referred to as an end ER, and the other end located on the left side of the user is referred to as an end EL. The right holding part 21 is provided to extend from the end ER of the front frame 27 to a position corresponding to the right head of the user wearing the image display unit 20. The left holding part 23 is provided to extend from the end EL of the front frame 27 to a position corresponding to the left head of the user wearing the image display unit 20.

The right light-guiding plate 26 and the left light-guiding plate 28 are provided in the front frame 27. The right light-guiding plate 26 is positioned in front of the right eye of the user wearing the image display unit 20 to allow the right eye to visually recognize an image. The left light-guiding plate 28 is positioned in front of the left eye of the user wearing the image display unit 20 to allow the left eye to visually recognize an image.

The front frame 27 has a shape in which an end of the right light-guiding plate 26 is connected to an end of the left light-guiding plate 28. The position of the connection corresponds to a position between the eyebrows of the user wearing the image display unit 20. The front frame 27 may include a nose pad part that comes in contact with the nose of the user wearing the image display unit 20, the nose pad part being provided at the position of the connection of the right light-guiding plate 26 and the left light-guiding plate 28. In this case, the nose pad part, the right holding part 21, and the left holding part 23 allow the image display unit 20 to be held around the head of the user. In addition, a belt that brings the right holding part 21 and the left holding part 23 in contact with the back of the head of the user wearing the image display unit 20 may also be connected to the right holding part 21 and the left holding part 23. In this case, the belt enables the image display unit 20 to be firmly held around the head of the user.

The right display unit 22 displays images on the right light-guiding plate 26. The right display unit 22 is provided on the right holding part 21 and is positioned adjacent to the right head of the user wearing the image display unit 20. The left display unit 24 displays images on the left light-guiding plate 28. The left display unit 24 is provided on the left holding part 23 and is positioned adjacent to the left head of the user wearing the image display unit 20.

The right light-guiding plate 26 and the left light-guiding plate 28 according to this embodiment are optical parts (e.g., prisms or holograms) formed of a light-transmitting resin or the like, and guide imaging light output by the right display unit 22 and the left display unit 24 to the eyes of the user. Note that surfaces of the right light-guiding plate 26 and the left light-guiding plate 28 may be provided with light control plates. The light control plates are thin plate-like optical elements having varying transmittance depending on a wavelength region of light, and function as so-called wavelength filters. The light control plates are arranged to cover a surface of the front frame 27 (the surface opposite to the surface facing the eyes of the user), for example. Appropriate selection of optical properties of the light control plates allows the transmittance of light in any wavelength region, such as visible light, infrared light, and ultraviolet light to be adjusted, and allows an amount of outside light incident on the right light-guiding plate 26 and the left light-guiding plate 28 from outside and passing through the right light-guiding plate 26 and the left light-guiding plate 28 to be adjusted.

The image display unit 20 guides imaging light generated by the right display unit 22 and the left display unit 24 to the right light-guiding plate 26 and the left light-guiding plate 28, respectively, and allows the user to visually recognize a virtual image with the imaging light (which will also be referred to as "displaying an image"). When the outside light traveling from in front of the user passes through the right light-guiding plate 26 and the left light-guiding plate 28 and is incident on the eyes of the user, the imaging light forming a virtual image and the outside light are incident on the eyes of the user. Thus, the visibility of virtual images viewed by the user can be affected by the intensity of the outside light.

Thus, the ease of visual recognition of virtual images can be adjusted, for example, by mounting the light control plates on the front frame 27 and appropriately selecting or adjusting the optical properties of the light control plates. In a typical example, a light control plate having optical transparency to the extent that a user wearing the HMD 100 serving as a display system can visually recognize at least an outside scene may be selected. The use of the light control plates is expected to be effective for protecting the right light-guiding plate 26 and the left light-guiding plate 28 and preventing damage to the right light-guiding plate 26 and the left light-guiding plate 28, adhesion of dust, and the like. The light control plates may be detachable from the front frame 27 or each of the right light-guiding plate 26 and the left light-guiding plate 28. Alternatively, a plurality of different types of light control plates may be provided to be detachable for replacement, or the light control plates may be omitted.

In addition to the above-described members for image display, the image display unit 20 is provided with video cameras 61R and 61L, an inward-facing camera 62, an illuminance sensor 65, a six-axis sensor 66, and an indicator 67. The two video cameras 61R and 61L are arranged on the front frame 27 of the image display unit 20. The two video cameras 61R and 61L are provided at positions approximately corresponding to the eyes of a user, and are designed to be able to measure the distance to a target object in so-called binocular vision. The distance is measured by the control device 70. Note that the video cameras 61R and 61L may be provided at any position as long as a distance can be measured in a binocular vision, or may be disposed at the ends ER and EL of the front frame 27. Note that a distance to a target object can be measured using a configuration implemented by the analysis of a monocular camera and an image of the camera, a configuration implemented by a millimeter wave radar, or the like.

The video cameras 61R and 61L are digital cameras including an imaging element such as a CCD or a CMOS, an imaging lens, and the like. The video cameras 61R and 61L capture an image of at least part of an outside scene (real space) in a forward direction from the HMD 100, in other words, in a direction of the visual field of the user wearing the image display unit 20. The video cameras 61R and 61L capture an image in a range overlapping the visual field of the user or in the direction of the visual field of the user to perform imaging in a direction for visual recognition of the user. In this embodiment, a width of an angle of view of the video cameras 61R and 61L is set to allow the video cameras 61R and 61L to capture the entire visual field of the user in which the user can have visual recognition through the right light-guiding plate 26 and the left light-guiding plate 28. An optical system capable of appropriately setting the width of the angle of view of the video cameras 61R and 61L may be provided.

Similarly to the video cameras 61R and 61L, the inward-facing camera 62 is a digital camera equipped with an imaging element such as a CCD or a CMOS, an imaging lens, and the like. The inward-facing camera 62 captures an image in an inward direction of the HMD 100, in other words, in a direction facing the user wearing the image display unit 20. The inward-facing camera 62 of this embodiment includes an inward-facing camera for capturing an image of the right eye of the user, and an inward-facing camera for capturing an image of the left eye of the user. In this embodiment, a width of the angle of view of the inward-facing camera 62 is set to a range in which an image of the entire right eye or the entire left eye of the user can be captured. The inward-facing camera 62 is used to detect a position of the eyeballs of the user, particularly a position of the pupils, and to calculate a direction of the line-of-sight of the user from a position of the pupils of the eyes. Of course, the inward-facing camera 62 may be provided with an optical system capable of appropriately setting a width of the angle of view, and may be used to read a facial expression of the user or the like by capturing not only an image of the pupils of the user but also a larger region.

The illuminance sensor 65 is provided at the end ER of the front frame 27 and is disposed to receive outside light from the front of the user wearing the image display unit 20. The illuminance sensor 65 outputs a detection value corresponding to an amount of received light (intensity of received light). The LED indicator 67 is disposed at the end ER of the front frame 27. The LED indicator 67 is turned on during image capturing by the video cameras 61R and 61L to notify that the imaging is in progress.

The six-axis sensor 66 is an acceleration sensor and detects an amount of movement of the head of the user in X, Y, and Z directions (3 axes) and the inclination of the head of the user in the X, Y, and Z directions (3 axes). With respect to the X, Y, and Z directions, the Z direction is a direction along the gravitational direction, the X direction is a direction from the rear to the front of the user, and the Y direction is a direction from the left to the right of the user. In addition, an inclination of the head is an angle around each axis (X-axis, Y-axis, and Z-axis) of the X, Y, and Z directions. An amount of movement and an angle of the head of the user from an initial position can be ascertained by combining signals from the six-axis sensor 66.

The image display unit 20 is coupled to the control device 70 via a coupling cable 40. The coupling cable 40 is pulled from the tip of the left holding part 23 and is detachably coupled to a connector 77 provided on the control device 70 via a relay connector 46. The coupling cable 40 includes a headset 30. The headset 30 includes a microphone 63, and a right ear bud 32 and a left ear bud 34 attached to the left and right ears of the user. The headset 30 is coupled to the relay connector 46 and is integrated into the coupling cable 40.

Figure 2:
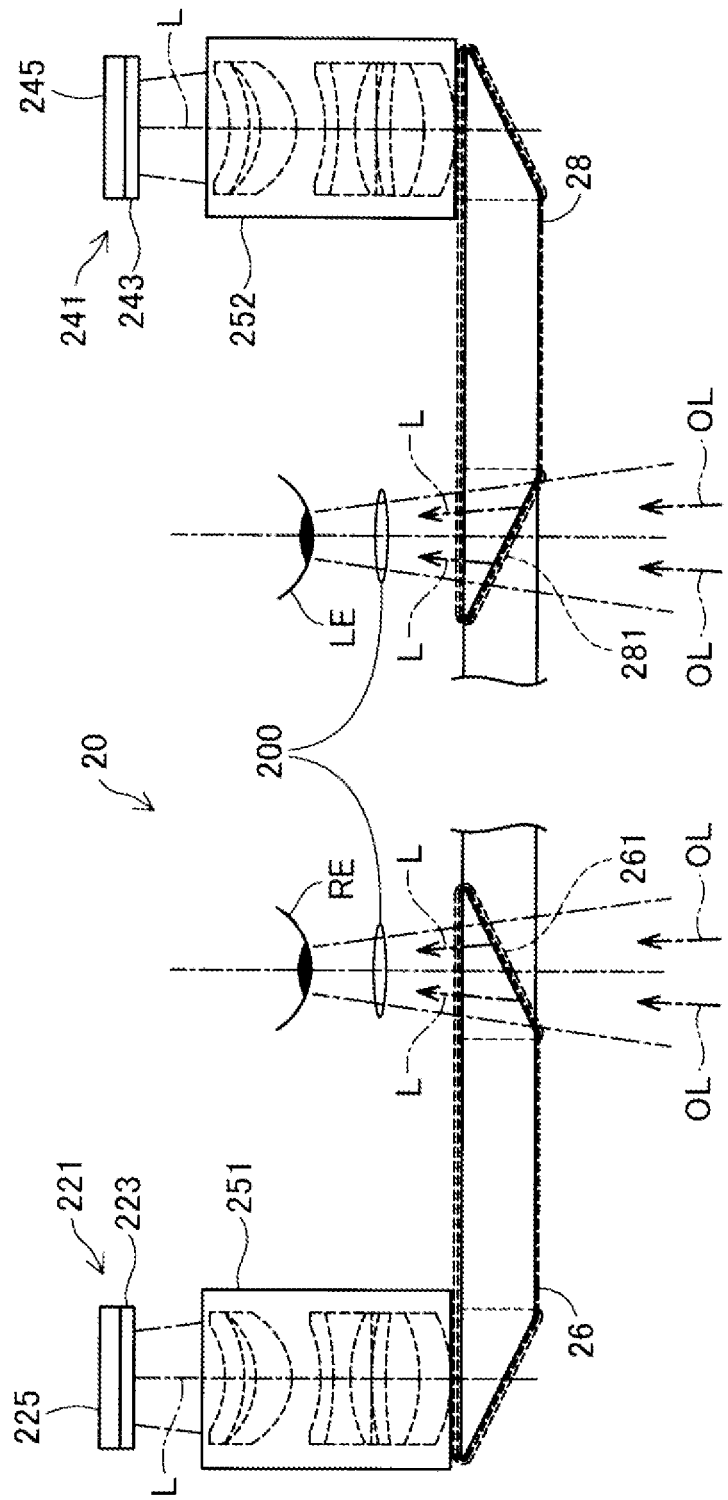
FIG. 2 is a plan view illustrating a configuration of a main part of an optical system included in an image display unit.

When a signal from the control device 70 for displaying an image is output to the image display unit 20 via the coupling cable 40, the image display unit 20 forms an image using the right display unit 22 and the left display unit 24. An optical configuration for helping the user recognize an image will be described. FIG. 2 is a plan view illustrating a main part of a configuration of an optical system included in the image display unit 20. For convenience of description, FIG. 2 illustrates the right eye RE and left eye LE of a user. As illustrated in FIG. 2, the right display unit 22 and the left display unit 24 are configured to be symmetric on the right- and left-hand sides.

As a configuration to allow the right eye RE to visually recognize a virtual image, the right display unit 22 serving as a right image display unit includes an organic light emitting diode (OLED) unit 221 and a right optical system 251. The OLED unit 221 emits imaging light. The right optical system 251 includes a lens group and the like and guides, to the right light-guiding plate 26, imaging light L emitted by the OLED unit 221.

The OLED unit 221 includes an OLED panel 223 (which will be abbreviated simply as an OLED) and an OLED driving circuit (which will be abbreviated simply as an R-CPLD) 225 configured to drive the OLED 223. The OLED 223 is a self-luminous display panel including light-emitting elements configured to emit red (R), green (G), and blue (B) color light, respectively, using organic electro-luminescence. The OLED 223 includes a plurality of pixels arranged in a matrix form, and each pixel including one R, G, and B elements as one unit.

The R-CPLD 225 selects and powers the light-emitting elements included in the OLED 223 according to a signal transmitted from the control device 70 to cause the light-emitting elements to emit light. The R-CPLD 225 is fixed onto a rear surface of the OLED 223, i.e., the back side of a light-emitting surface by bonding or the like. The R-CPLD 225 may include, for example, a semiconductor device configured to drive the OLED 223, and may be mounted onto a substrate fixed to the rear surface of the OLED 223. Note that the OLED 223 may adopt a configuration in which light-emitting elements that emit white light are disposed in a matrix form and are disposed over color filters corresponding to the colors R, G, and B, respectively. In addition, an OLED 223 with a WRGB configuration including light-emitting elements configured to radiate white (W) light in addition to light-emitting elements configured to radiate R, G, and B light, respectively, may be adopted.

The right optical system 251 includes a collimating lens configured to collimate the imaging light L emitted from the OLED 223 into a luminous flux in a parallel state. The imaging light L collimated by the collimate lens into a luminous flux in a parallel state is incident on the right light-guiding plate 26. On an optical path configured to guide light inside the right light-guiding plate 26, a plurality of reflective surfaces configured to reflect the imaging light L are formed. The imaging light L is reflected multiple times inside the right light-guiding plate 26 and then, is guided to the right eye RE side. A half mirror 261 (reflective surface) positioned in front of the right eye RE is formed in the right light-guiding plate 26. The imaging light L reflected by the half mirror 261 is emitted from the right light-guiding plate 26 to the right eye RE to form an image on the retina of the right eye RE to allow the user to visually recognize a virtual image.

As a configuration to allow the left eye LE to visually recognize a virtual image, the left display unit 24 serving as a left image display unit includes an OLED unit 241 and a left optical system 252. The OLED unit 241 emits imaging light. The left optical system 252 includes a lens group and the like and guides, to the left light-guiding plate 28, imaging light L emitted by the OLED unit 241. The OLED unit 241 includes an OLED 243, and an L-CPLD 245 configured to drive the OLED 243. Details of each of the units are the same as those of the OLED unit 221, the OLED 223, and the R-CPLD 225. Details of the left optical system 252 are the same as those of the right optical system 251.

The image display unit 20 includes the optical systems that guide the imaging light L to the right and left eyes of the user as described above using FIG. 2 and an optical system that guides external light OL. Thus, the optical systems that direct the imaging light L to the right and left eyes of the user to cause the user to visually recognize virtual images will be referred to as a first display unit 200 in the following description.

According to the configuration described above, the HMD 100 can function as a see-through display device. That is, the imaging light L reflected by the half mirror 261 and outside light OL passing through the right light-guiding plate 26 are incident on the right eye RE of the user. The imaging light L reflected by a half mirror 281 and outside light OL passing through the left light-guiding plate 28 are incident on the left eye LE of the user. In this manner, the HMD 100 allows the imaging light L of the image processed inside and the outside light OL to be incident on the eyes of the user in an overlapped manner. As a result, the user can view an outside scene (real world) through the right light-guiding plate 26 and the left light-guiding plate 28 and also visually recognize a virtual image formed by the imaging light L overlapping the outside scene. In other words, the image display unit 20 of the HMD 100 allows the outside scene to pass through the image display unit and causes the user to visually recognize the outside scene in addition to the virtual image.

The half mirrors 261 and 281 reflect imaging light output by the right display unit 22 and the left display unit 24, respectively, and extract an image. In addition, the right optical system 251 and the right light-guiding plate 26 are also collectively referred to as a "right light-guiding unit", and the left optical system 252 and the left light-guiding plate 28 are also collectively referred to as a "left light-guiding unit". Configurations of the right light-guiding unit and the left light-guiding unit are not limited to the example described above, and any configuration can be used as long as a virtual image can be formed in front of the eyes of the user using imaging light. For example, diffraction gratings or translucent reflective films may be used for the right light-guiding unit and the left light-guiding unit.

Figure 3:
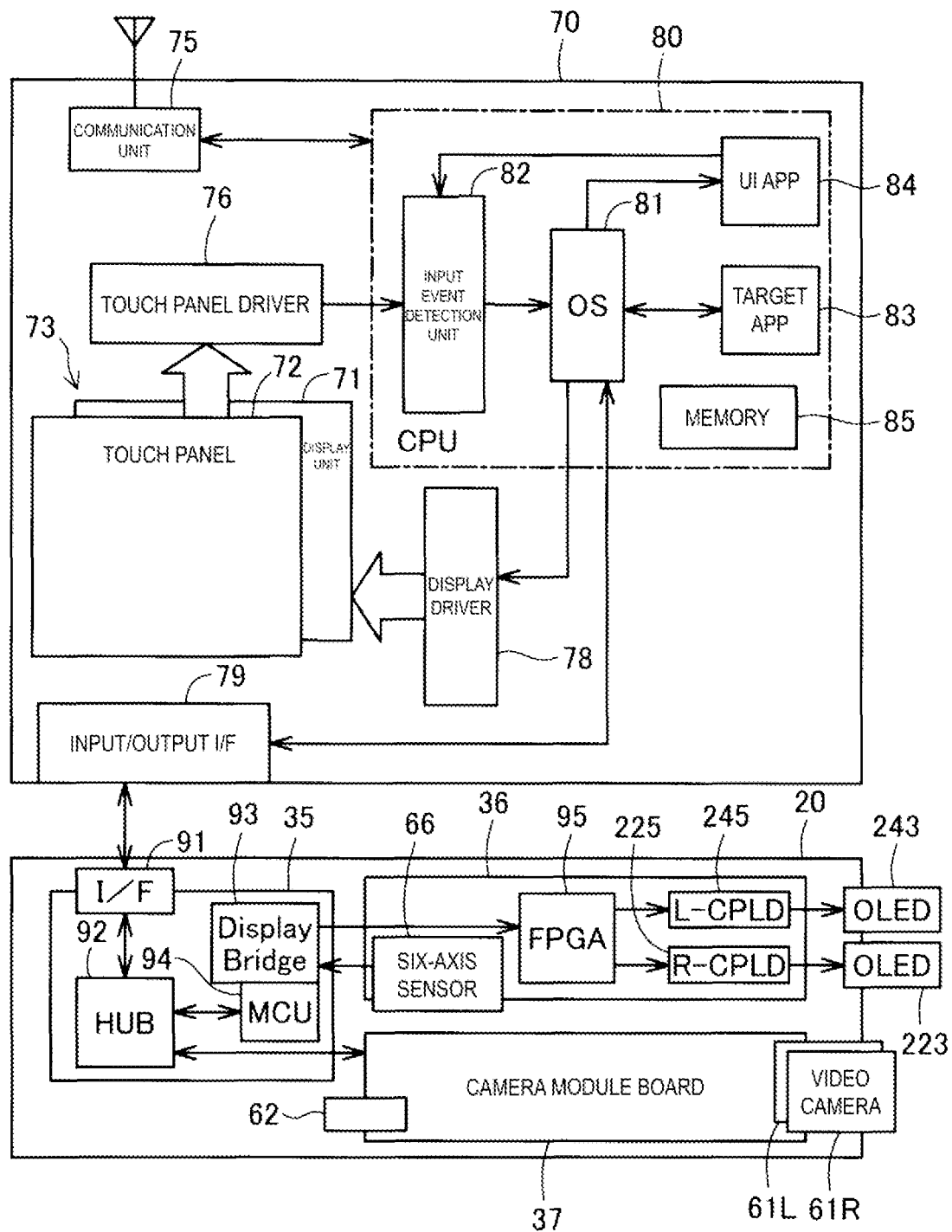
FIG. 3 is a schematic configuration diagram illustrating a configuration of a signal processing circuit of the display device.

A-2. Configuration of Control Device 70:

Next, a configuration of the control device 70 that outputs various signals to the image display unit 20 will be described. FIG. 3 is a block diagram illustrating an internal configuration of the control device 70 and the image display unit 20. The control device 70 includes, in addition to the second display unit 73 described above, a communication unit 75, a CPU 80, a touch panel driver 76, a display driver 78, an input/output interface (which will be abbreviated simply as an input/output I/F below) 79, and the like. Note that driving power of the control device 70 is supplied to each of the units from a battery which is not illustrated in the drawing.

The second display unit 73 includes a display unit 71 that displays images in full color and a touch panel 72 that detects the position and strength of a touch on the display unit 71 when a user touches the display unit 71 with his or her fingertip or the like. The display unit 71 is driven by the display driver 78 that receives a signal from the CPU 80. In addition, the touch panel 72 is coupled to the touch panel driver 76, receives a driving signal from the touch panel driver 76 to dynamically detect a touch position on the second display unit 73, and outputs the detected touch position and the strength to the CPU 80 via the touch panel driver 76.

The communication unit 75 communicates with a mobile terminal 110 and receives a video signal including images and sound. Any communication method such as Wi-Fi (registered trademark), BlueTooth (registered trademark), or the like may be adopted. In addition, the video signal may be received from the mobile terminal 110 via a wire. The input/output I/F 79 may have a connector form conforming to the so-called Type-C standard and is capable of inputting and outputting data in serial communication.

The CPU 80 that controls each of the units includes a memory 85 and realizes functions of an operating system (which will be abbreviated simply as an OS) 81, an input event detection unit 82, and the like by executing programs stored in the memory 85. The OS 81 used in this embodiment has the same basic function as that of a general-purpose OS used in the mobile terminal 110 and the like. Differences from the general-purpose OS are the expanded functions of capturing images of outside scenes using the video cameras 61R and 61L, detecting a line-of-sight using the inward-facing camera 62, displaying images on the second display unit 73 along with the first display unit 200, and the like. Thus, an application program created for the OS 81 can be executed by the control device 70 as is or with a slight modification. Conceivable examples of such an application program include games, application programs that support various kinds of work, and the like. Such an application program will be referred to as a target app 83. In addition, in this embodiment, separate from the target app 83, a user interface support application program (which will be simply referred to as a UI app below) 84 that provides various input methods can be executed concurrently with the target app 83.

The CPU 80 outputs the video received from the mobile terminal 110 via the communication unit 75 to the image display unit 20 via the input/output I/F 79 under control of the OS 81. In conjunction with such input and output of video signals, the CPU 80 handles the second display unit 73 as an input unit, causes images such as buttons, keys, or fields necessary for input to be displayed on the display unit 71 via the display driver 78, and inputs the position and strength of a touch of the user on the touch panel 72 in accordance with the display via the touch panel driver 76. The position and strength of the touch detected by the touch panel driver 76 are input to the input event detection unit 82, collated with the status of the user interface for input received from the UI app 84, interpreted by the OS 81, and output to the target app 83. The form of the user interface for input and the technique of input by the OS 81 and the UI app 84 will be described in detail below.

The CPU 80 outputs the video input via the communication unit 75 to the image display unit 20 via the input/output I/F 79 under control of the OS 81. The image display unit 20 is constituted broadly by a basic board 35, an optical module board 36, and a camera module board 37 as illustrated at the lower part of FIG. 3. The basic board 35 is equipped with an interface unit (which will be simply referred to as an I/F unit) 91 that exchanges video signals with the input/output I/F 79 of the control device 70, a HUB 92 that separates signals and mediates the signals between the I/F unit 91 and other units, an MCU 94 that takes a part of the signals from the HUB 92 to operate, and a display bridge 93 that processes video signals with a help of processing by the MCU 94 and outputs the video signals to the optical module board 36.

Another signal line from the HUB 92 is coupled to the camera module board 37 and is used to output video signals from the video cameras 61R and 61L and the inward-facing camera 62 mounted on the camera module board 37 to the control device 70 via the HUB 92 and the I/F unit 91. The CPU 80 can analyze videos from the video cameras 61R and 61L, recognize a product, or the like present in the visual field of the user, and also can perform processing such as causing the image display unit 20 to display provided information of the product. In addition, the CPU 80 can also analyze the video from the inward-facing camera 62 to specify the direction of the line-of-sight of the user and perform processing such as specifying the target object that the user is viewing in the outside scene captured by the video cameras 61R and 61L.

The optical module board 36 is equipped with an FPGA 95, and the R-CPLD 225, the L-CPLD 245, and the six-axis sensor 66 that are described above. The FPGA 95 is coupled to the display bridge 93 of the basic board 35, separates video signals received from the display bridge 93 into video signals for the right and left eyes, and further converts the signals into RGB signals. The R-CPLD 225 and the L-CPLD 245 drive the OLEDs 223 and 243 in accordance with the signals from the FPGA 95. The six-axis sensor 66 is coupled to the display bridge 93 on the basic board 35 and outputs postures (on three axes) and accelerations of the image display unit 20 in each axial direction (on three axes).

The three axes indicating postures are for postures in the Z-axis direction (top-bottom direction) that is the gravitational direction, the Y-axis direction (left-right direction) that is the direction that is orthogonal to the Z-axis direction and extends from the right eye to the left eye of the user wearing the image display unit 20 (FIG. 1), and the X-axis direction (front-rear direction) that is the direction orthogonal to the Z-axis and the Y-axis. By nature, the head of a human easily takes four postures due to the structure of the skeleton, the four postures including a right-side rotational posture in which the head rotates to the right eye side approximately about the Z-axis (the arrow RT side in FIG. 1), a left-side rotational posture in which the head likewise rotates to the left eye side (arrow LT side in FIG. 1), an upward rotational posture in which the head rotates upward (arrow UP side in FIG. 1), and a downward rotational posture in which the head rotates downward (arrow DW in FIG. 1), and thus the image display unit 20 may be configured such that signals from the six-axis sensor 66 are processed on the image display unit 20 side and are output as the four postures. An acceleration is an acceleration in each of the X-, Y-, and Z-axis directions.

Figure 4:
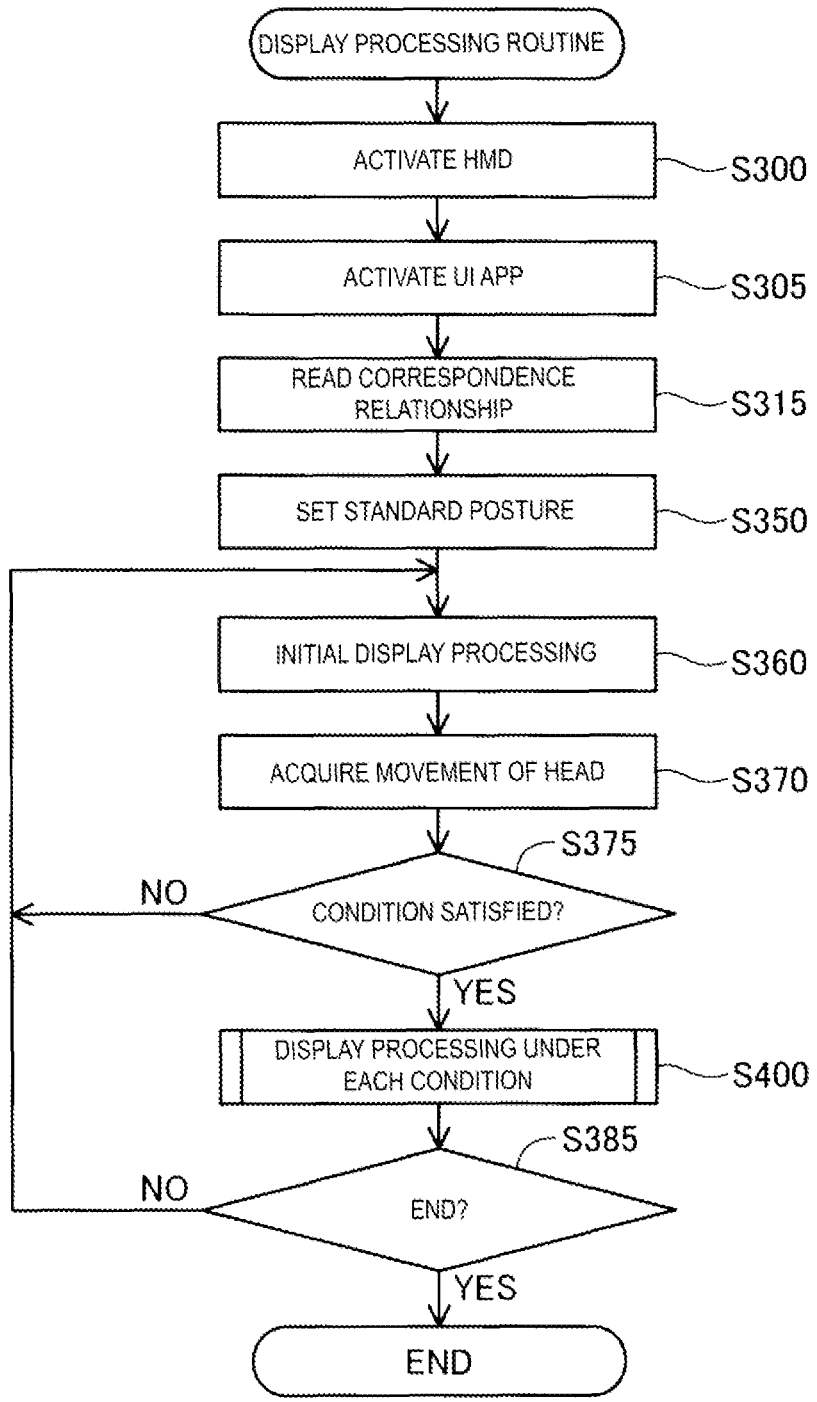
FIG. 4 is a flowchart showing a display processing routine executed by a control device in a first embodiment.

A-3. Aspect of Display and Input:

On the premise of the hardware described above, modes of display and input performed by the HMD 100 will be described. FIG. 4 is a flowchart showing a display processing routine executed by the control device 70. This processing begins by inputting power to the control device 70 and selecting a specific application program, that is, the set target app 83, to instruct the control device to activate the app.

When the processing starts in the HMD 100 of the first embodiment, the control device 70 sends power to the image display unit 20 via the coupling cable 40 to activate the entire HMD 100 (step S300). Thereafter, the control device 70 activates the UI app 84 before starting the target app 83 (step S305). The UI app 84 is an application program that supports input of data to various target apps 83 under instructions of the OS 81 as illustrated in FIG. 3. Because the target app 83 operates under control of the OS 81, if the UI app 84 is not activated, the UI app displays a button or a field for input on a screen that is controlled by itself, that is, a screen displayed on the image display unit 20, and performs an operation of the button, input of text data input to the field, and the like via an input mechanism provided by the OS 81. Examples of the input mechanism include a mechanism in which a virtual button displayed on the image display unit 20 is selected by detecting a line-of-sight using the inward-facing camera 62, detecting the line-of-sight being blocked by a movement of the eyelid movement, and pressing (determining) the selected button, and a mechanism in which a sound input by the microphone 63 is recognized and text data is input to the field selected by the line-of-sight.

These mechanisms are realized by invoking a function call provided by the OS 81 on standard from the application program side. The OS 81 is set to provide various function calls dedicated to the HMD 100 to allow the application program to display a specific button or field and accept an input from the user while the UI app 84 is not activated. On the other hand, when the UI app 84 is activated in step S105, the OS 81 operating on the control device 70 makes a change such that invoking of the function call provided on standard is passed to the UI app 84.

Next, processing to read a relationship between a movement of the head of the user wearing the HMD 100 and display on the first display unit 200 and the second display unit 73 is performed (step S315). Examples of such a relationship are shown in FIG. 5A. The target app 83 activated in this embodiment determines first to third movements as movements of the head. The first movement is a movement of the head turning 40 degrees or more to a right side RT from a standard posture set as 0 degrees, which will be described below, and a relationship between display and input at this time is that a dynamic image is displayed on the first display unit 200 and a remote controller for controlling playback of the dynamic image is displayed on the second display unit 73. This display and input mode is referred to as first display processing. Note that an angle for the determination is not limited to 40 degrees, and can be set as desired, such as 30 degrees.

The second movement is a movement of the head turning 40 degrees or more to a left side LT from the standard posture set as 0 degrees, which will be described below, and a relationship between display and input at this time is that game 1 is displayed on the first display unit 200 and a gaming pad for controlling progress in the game is displayed on the second display unit 73. Of course, an angle for the determination is not limited to 40 degrees, and can be set as desired, such as 30 degrees. This display and input mode is referred to as second display processing. In addition, the third movement is a movement of the head tilting 15 degrees or more to a downward direction DW from the standard posture, which will be described below, and a relationship between display and input at this time is that an application program selection screen is displayed on the first display unit 200 and a composite input pad which enables selection on the selection screen is displayed on the second display unit 73. This display and input mode is referred to as third display processing. Note that, in this embodiment, when any of the first to third display processing is performed due to a movement of the head from the standard posture, the display on the first display unit 200 changes, and thus the user can anticipate that the input mode of the second display unit 73 may have switched; however, when the input mode of the second display unit 73 is switched even though the display on the first display unit 200 in the standard posture is not switched from the display of the first to the third display processing, a switch sound or a guide sound such as "input mode has changed" may be output to the right and left ear buds 32 and 34. Furthermore, a vibrator using a piezoelectric element or the like may be incorporated into the control device 70 to vibrate the device and give the notification. Of course, the first display unit 200 may indicate that the second display unit 73 has switched the input mode.

After completing the above preparation, processing by the target app 83 designated to be activated is started. Thus, the processing from step S350 which will be described below is performed during processing of the target app 83. Next, the control device 70 sets a standard posture (step S350). The standard posture is an initial posture made when the user works using the HMD 100. Normally, the posture made when detecting the target in step S120 is registered as a standard posture. The standard posture is set based on angles of the head of the user in the X, Y, and Z-axis directions acquired from the six-axis sensor 66. A movement of the head of the user, which will be described below, is detected as a movement from this standard posture.

Although the standard posture is assumed to be defined as a posture made when the target is detected in this embodiment, the standard posture can be variously defined in accordance with types of work, or the like. A posture of the user is not limited to a posture of the user facing the front, and in some cases, a posture of the user facing the right side, the left side, or upward or downward is conceivable as a standard posture. In addition, a sit-and-work state may be a standard posture, and a stand-and-work state may be a standard posture. Various methods can be used to set a standard posture. One of the methods may be configured such that a "standard posture setting button" is displayed on the display 73 of the control device 70 and the posture made when the user is pressing the button may be registered as a "standard posture". A standard posture may be registered using voice recognition or the like, instead of a button. Furthermore, several postures may be registered in advance as standard posture candidates, and one of them may be selected as a standard posture. Furthermore, standard postures may be defined according to a work stand or a desk on which a user works, a cart or a workpiece carried by a conveyor or a line, a tool or a jig operated by users, and the like.

Alternatively, a SLAM technology in which a map of an environment in which a user is using the HMD 100 and the location of the user in the environment map are estimated from a large number of images obtained by capturing the surroundings of the user by an external camera (not illustrated) moving the place around the user using the HMD 100 or by the video cameras 61R and 61L provided on the HMD 100 may be used to recognize the location and the posture of the user in the use environment and defined a standard posture based on the location and the posture. Among locations and postures of the user in the use environment recognized using the SLAM technology, the location and the posture in which the user remained and worked most frequently or for a long time may be set as a standard posture, or the location and posture taken at the start of work may be set as a standard posture. Alternatively, a standard posture may be defined based on a location and a posture taken at another predetermined time.

When the setting of the standard posture is completed, initial display processing is then performed (step S360). The initial display processing is to perform preset initial display on the outside scene viewed by the user through the image display unit 20. As an initial display, for example, it is conceivable to display a use instruction of the HMD 100 previously prepared or display an arrow indicating that there is another display outside of the screen the user is viewing in the standard posture.

Next, the control device 70 performs processing of acquiring the movement of the head based on information from the six-axis sensor 66 provided in the image display unit 20 (step S370). Although movements of the head can be in various forms, a movement can be acquired as, for example, information created by arbitrarily combining information of the direction in which the head moves among the upward, downward, left, and right directions, an angle of the head, a magnitude of the acceleration of the movement, and the like. Here, as described using FIG. 1 before, the upward, downward, left, and right directions are the upward direction UP in which the user raises the face (head), the downward direction DW in which the user lowers the face, the left side LT to which the user turns his or her face in the left direction, and the right side RT to which the user turns his or her face in the right direction.

After acquiring the movement of the head, it is determined whether the movement satisfies a predetermined condition (step S375), and if the condition is satisfied, display processing corresponding to each condition is performed (step S400). Details of the display processing (step S400) will be described later. If the condition is not satisfied (step S375: "NO"), the processing returns to step S360 to repeat the processing described above. On the other hand, when the condition is satisfied and the display processing (step S400) is performed, it is then determined if the work is to be ended (step S385), and when the control device 70 ends the target app 83 or the control device 70 is turned off, the processing proceeds to "END" to end the present processing routine. If it is determined that the processing is not to be ended, the processing returns to step S360 to repeat the above-described processing.

Figure 5B:
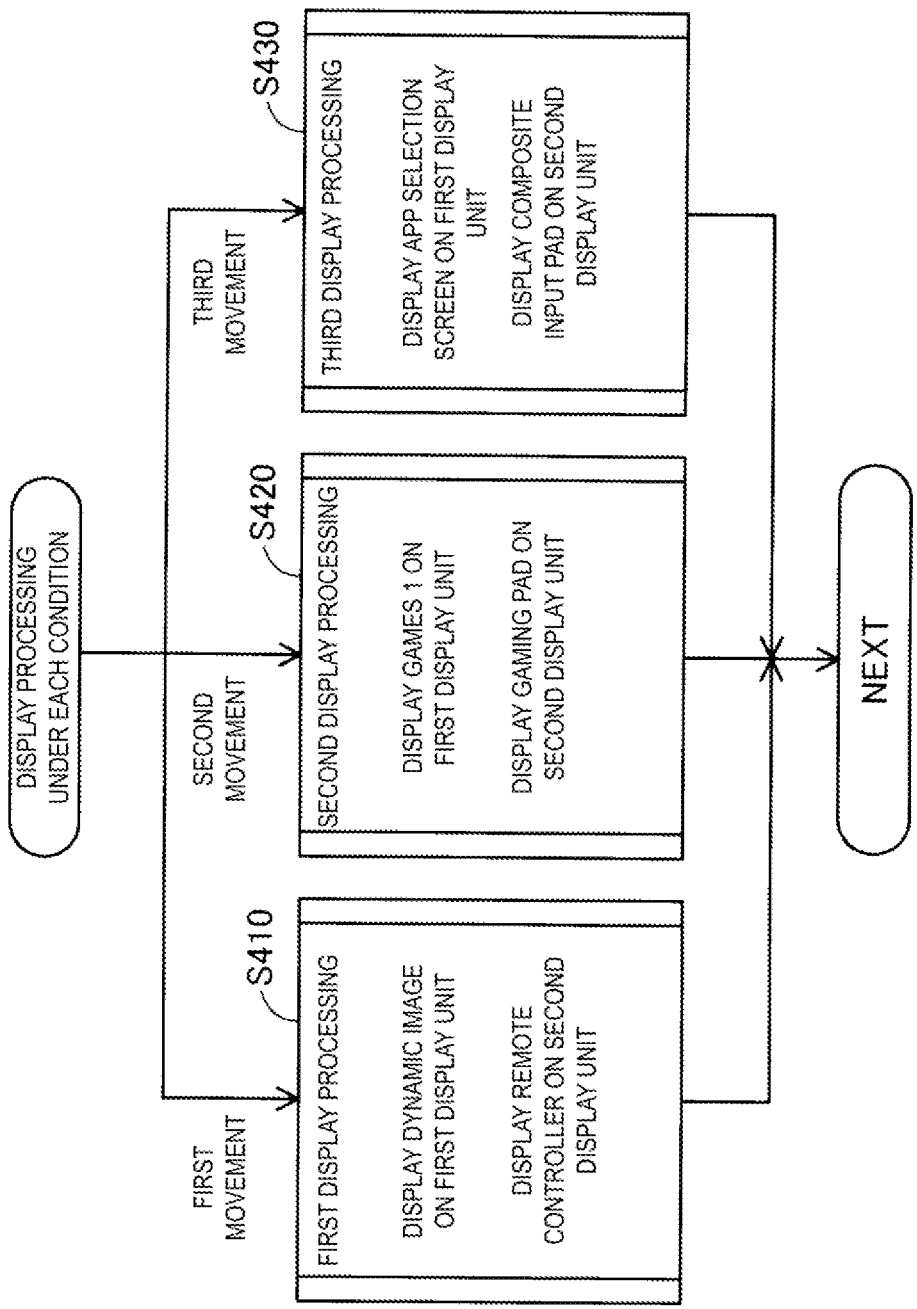
FIG. 5B is a flowchart showing display processing under conditions.

Next, the processing of step S400 in FIG. 4, that is, display processing when each condition is satisfied, will be described using FIG. 5B. When the movement of the head satisfies the predetermined condition in step S375, the control device 70 performs the next display processing under each condition. In the example illustrated in FIG. 5B, there are three types of conditions for detecting a movement of the head and display processing applied to such cases.

1 Condition 1: First Movement (when the Head Faces the Right Side)

When it is determined based on a signal from the six-axis sensor 66 that the head faces the right side at a predetermined angle (here, 40 degrees) or more from the standard posture, an application program for playing back a dynamic image is activated as the target app 83, the first display unit 200 of the image display unit 20 displays the dynamic image while the second display unit 73 displays a remote controller, and thereby input in an input mode using the remote controller is possible (step S410).

2 Condition 2: Second Movement (when the Head Faces the Left Side)

When it is determined based on a signal from the six-axis sensor 66 that the head faces the left side at a predetermined angle (here, 40 degrees) or more from the standard posture, a program for the game 1 is activated as the target app 83, the first display unit 200 displays a screen of the game 1 while the second display unit 73 displays a gaming pad, and thereby input in an input mode using the gaming pad is possible (step S420).

3 Condition 3: Third Movement (when the Head Faces Downward)

When it is determined based on a signal from the six-axis sensor 66 that the head faces downward at a predetermined angle (here, 15 degrees) or more from the standard posture, a program for selecting an application program is activated as the target app 83, the first display unit 200 displays an app selection screen while the second display unit 73 displays a composite input pad, and thereby input in an input mode using the composite input pad is possible (step S430).

After any of the above-described determination and display processing (steps S410 to S430) is performed, the processing proceeds to "NEXT" to end the processing routine.

Figure 6A:
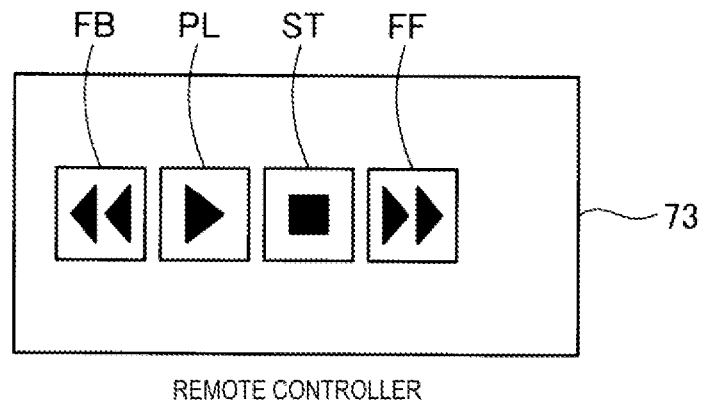
FIG. 6A is an explanatory diagram illustrating an example of display on the second display unit of the control device.

The display of the second display unit 73 and the input mode in each display processing (steps S410 to S430) described above will be described. FIG. 6A is a schematic diagram illustrating a remote controller displayed on the second display unit 73 under Condition 1. The remote controller is displayed with a playback button PL to instruct playback of a dynamic image displayed on the first display unit 200, a stop button ST to instruct a stop, a fast-forward button FF to instruct fast forward of the dynamic image, a rewind button FB to instruct rewinding of the dynamic image, and the like. When the user touches any of the buttons viewing the display of the remote controller of the second display unit 73, the input event detection unit 82 detects an operation on the touch panel 72 via the touch panel driver 76, determines which button has been pressed, and outputs an event assigned to the button, i.e., an event such as start of playback, stop, fast forwarding, rewinding of a dynamic image, or the like to the target app 83. As a result, the dynamic image displayed on the first display unit 200 is played back, stopped, fast forwarded, or rewound.

Figure 6B:
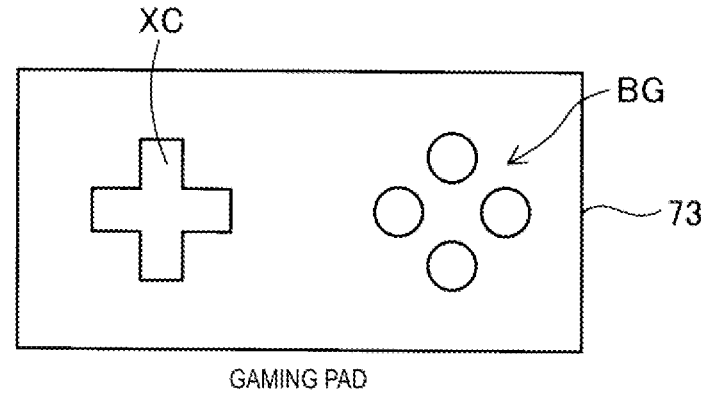
FIG. 6B is an explanatory diagram illustrating another example of display on the second display unit of the control device.

In addition, FIG. 6B is a schematic diagram illustrating a gaming pad displayed under Condition 2. The gaming pad displays a cross key XC and four selection buttons BG. When the user operates the cross key XC of the gaming pad displayed on the second display unit 73 or taps on any of the buttons BG as necessary while viewing the game displayed on the first display unit 200, the input event detection unit 82 detects the operation of the touch panel 72 via the touch panel driver 76 and determines in which direction the cross key XC has been operated or determines which of the buttons BG has been pressed, and instructs an event assigned to the button or a movement of a target character, a weapon, or the like, in the upward, downward, left, or right direction, or outputs an event such as specification of an operation of a weapon to the target app (here, the game) 83. As a result, the character displayed on the first display unit 200 moves or the weapon is operated.

Figure 6C:
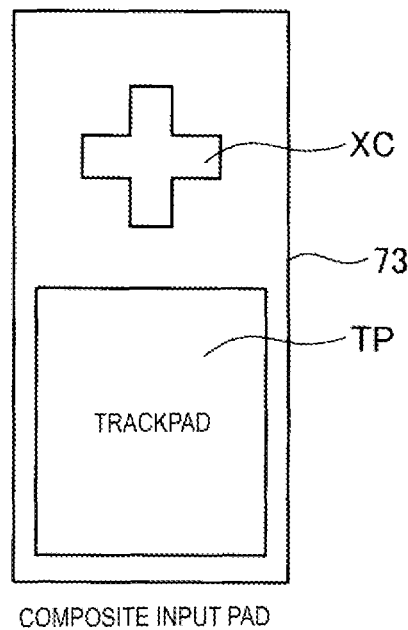
FIG. 6C is an explanatory diagram illustrating another example of display on the second display unit of the control device.

In addition, FIG. 6C is a schematic diagram illustrating a composite input pad displayed under Condition 3. A cross key XC and a trackpad TP are displayed in the composite input pad. When the user operates the cross key XC of the composite input pad displayed on the second display unit 73, or touches or drags on the trackpad TP as necessary while viewing a selection screen of an application program displayed on the first display unit 200, the input event detection unit 82 detects the operation of the touch panel 72 via the touch panel driver 76 and determines in which direction the cross key XC has been operated or identifies the movement of the finger on the trackpad TP, and instructs a movement of a cursor on the selection screen in the upward, downward, left, or right direction, or outputs an event such as selection of a desired application program to the target app (here, a program for selecting the application program) 83. As a result, the application program displayed on the first display unit 200 is selected, and in some cases, activated.

A-4. Actions and Effects of First Embodiment

According to the first embodiment described above, the user using the HMD 100 can cause a desired image to be displayed on the first display unit 200 by moving the head a predetermined angle or more in a predetermined direction from the standard posture and an image for an input mode necessary for the display of the first display unit 200 to be displayed on the second display unit 73, and thereby can perform input operations.

Furthermore, because the input processing is performed on the second display unit 73 integrated with the touch panel 72 in the first embodiment, it is not necessary to employ input processing using the image display unit 20, for example, input processing such as detecting a direction of the line-of-sight and the eyelids blocking the line-of-sight. Because it is easy to set the input processing to be similar to normal processing using the touch panel 72, for example, input processing with the mobile terminal 110, or the like, input operations can be simplified and intuitive. Moreover, in this embodiment, by changing the display of the display unit 71 of the second display unit 73, various input modes such as a remote controller, a gaming pad, a composite input pad, or the like can be realized.

Moreover, because such a variety of input modes are provided by UI app 84 and the input event detection unit 82 controlled by the OS81 at the level of the operating system for the environment in which the target app 83 operates, it is also easy to implant the target app 83 operating on a mobile terminal or the like on which a similar operating system is mounted.

Figure 6D:
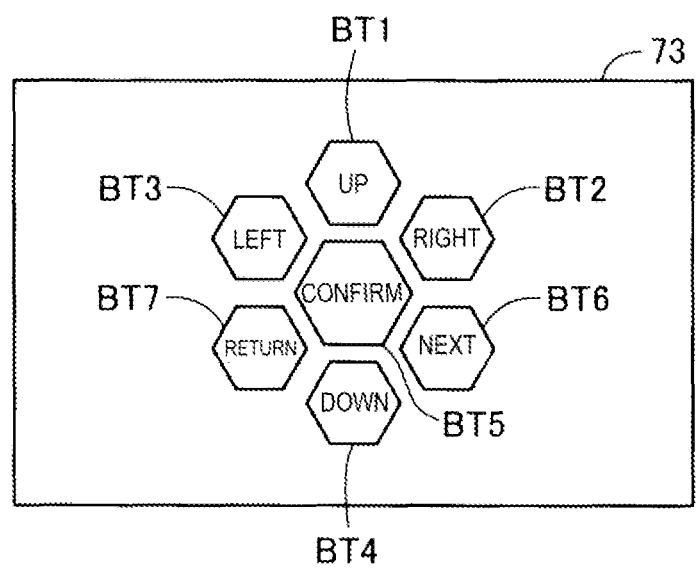
FIG. 6D is an explanatory diagram illustrating another example of display on the second display unit of the control device.

Although various input mechanisms such as a remote controller, a gaming pad, and a composite input pad may be displayed as each input mode on the second display unit 73 of the control device 70 in this embodiment, an input mechanism suitable for the input mode is not limited thereto. For example, as illustrated in FIG. 6D, an input mechanism with hexagonal buttons arranged may be displayed on the second display unit 73 to allow the user to operate the buttons. In this example, in addition to the buttons BT1 to BT4 for moving the cursor or the like displayed on the first display unit 200 of the image display unit 20 in each of the upward, right, left, and downward directions, a button BT5 for confirmation, buttons BT6 and BT7 for getting the game or the like forward and backward, and the like may be displayed and selected. Further, such a hexagonal-shaped button may be arranged outside the buttons BT1 to 7. An input mode in which buttons having a shape of filling such planes (triangular shape, square shape, hexagonal shape, or a combination of multiple shapes) are arranged to provide many options is also possible.

Figure 6E:
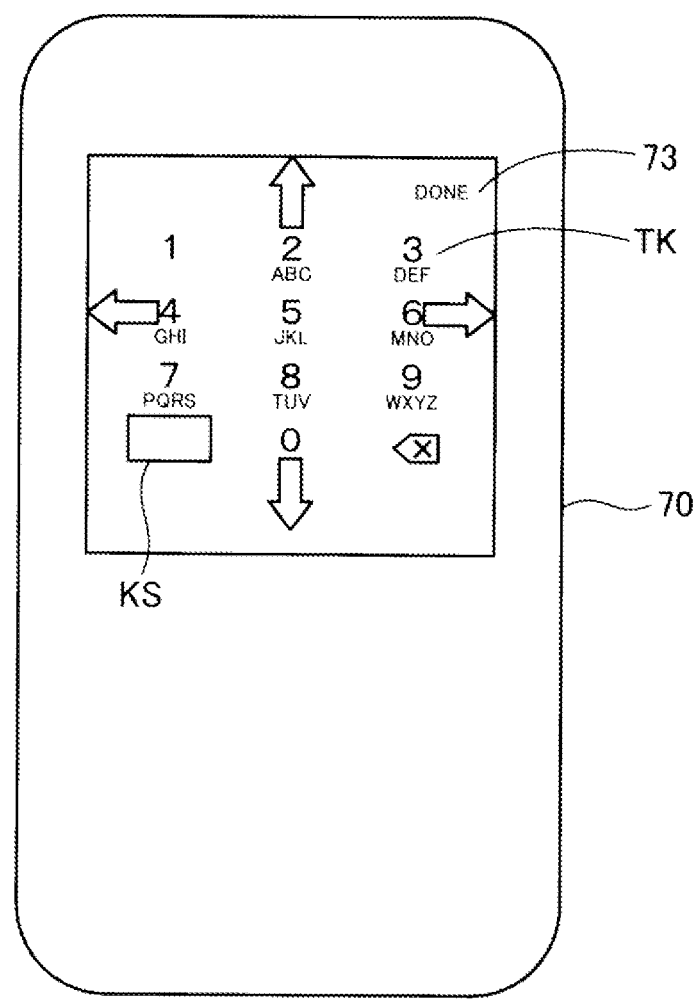
FIG. 6E is an explanatory diagram illustrating another example of display on the second display unit of the control device.

Alternatively, as illustrated in FIG. 6E, an input mechanism using a numeric keypad used in mobile phones or the like can also be employed. In this example, the numeric keypad is displayed on the second display unit 73, and when a location corresponding to each key is touched, a square-shaped cursor KS indicating that the key has been selected is displayed to enable the number or alphabet to be input. Originally, each key may be flipped left, right, up, and down to selectively input a plurality of types of characters. Furthermore, because characters can be input by touching each key and the entire display region also functions as a trackpad TP in this example, an application of the display region in which a cursor, a character, or the like displayed on the image display unit 20 is moved in any direction is also possible. Because the numeric keypad can be used to input alphabets, Japanese Kana characters, and the like associated in advance with the keys by touching the keys multiple times within a predetermined time, and it is also easy to input text with a mixture of Japanese Kana and Chinese characters, in combination with Japanese Kana-Chinese character conversion.

Figure 6F:
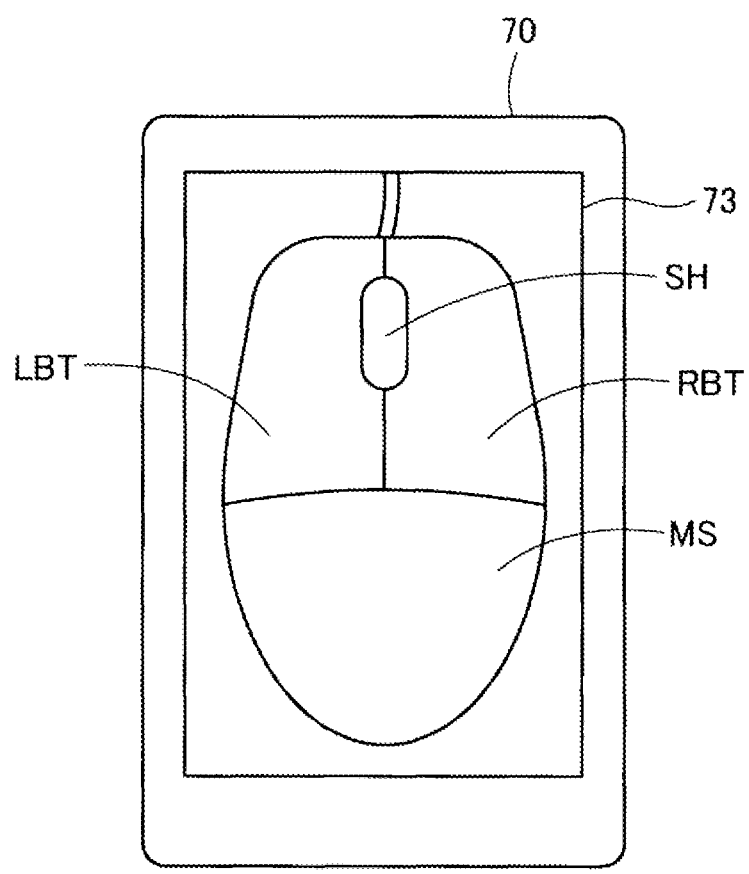
FIG. 6F is an explanatory diagram illustrating another example of display on the second display unit of the control device.

Furthermore, as illustrated in FIG. 6F, a virtual mouse MS may be displayed on the second display unit 73 of the control device 70, and thus a movement of the cursor, selection of a button, and the like may be realized on the first display unit 200 by operating the mouse MS. In the illustrated mouse MS, a device similar to a real mouse with a left and right mouse buttons LBT and RBT, a scroll wheel SR, and the like is displayed. The user can operate the left and right mouse buttons LBT and RBT by touching the display locations of the portions of the second display unit 73, and can scroll the screen or move an operation target displayed on the first display unit 200 in a specific direction by clicking the target or operating the scroll wheel SR.

Although several input modes have been described above, these input modes may be combined, or may be switched on the same display screen as required by the user. It has been described that an angle to determine a movement of the head of the user can be arbitrarily set. Because a so-called discriminative visual field in which a person gazes an object for visual recognition is within the range of approximately 5 degrees, for example, if an angle of the head exceeds the value, the head may be determined to face the left or right direction. Alternatively, because an effective visual field in which a person can receive information simply by eye movement is approximately 30 degrees in the left and right directions and approximately 20 degrees in the vertical direction, if the head moves by an angle exceeding the above angles, the user may be determined to have moved his/her head and have tries to see a different direction from the standard posture. Furthermore, in consideration of the fact that a stable field of fixation in which a person can comfortably gaze an object only with a movement of the eyeballs and a motion of his or her head without moving the trunk is 60 to 90 degrees in the left-right direction (widths differ depending on individuals) and 45 to 70 degrees in the up-down direction (widths differ depending on individuals), if a value exceeds the ranges, the person is determined to be viewing the object in a different direction using not only the movement of the head but also the entire body and thus the display mode can be changed. It is a matter of course that a movement of the head of the user may be determined based on not only an angle but also an angular velocity, various accelerations, or a combination thereof.

B. Second Embodiment

Next, a second embodiment will be described. An HMD 100 that is a display system of a second embodiment has a configuration similar to the system configuration of the first embodiment illustrated in FIGS. 1 to 3, and display processing is similar to that illustrated in FIG. 4. In the second embodiment, the relationship between movements of the head of the user, the first display unit 200, and the second display unit 73 has differences. The relationship between the two in the second embodiment is illustrated in FIG. 7.

As illustrated, in the second embodiment, the relationship is classified into five correspondences between display and input in advance with respect to the first display unit 200 and the second display unit 73 and mode names are given to the correspondences to be standardized and available for various target apps 83. Associating the standardized modes with movements of the head is entrusted to each target app 83. In the drawing, the line segment linking a movement of the head to a mode name indicates that both are associated by each target app 83. Thus, the relationship between the two can be determined for each target app 83.

Figure 7:
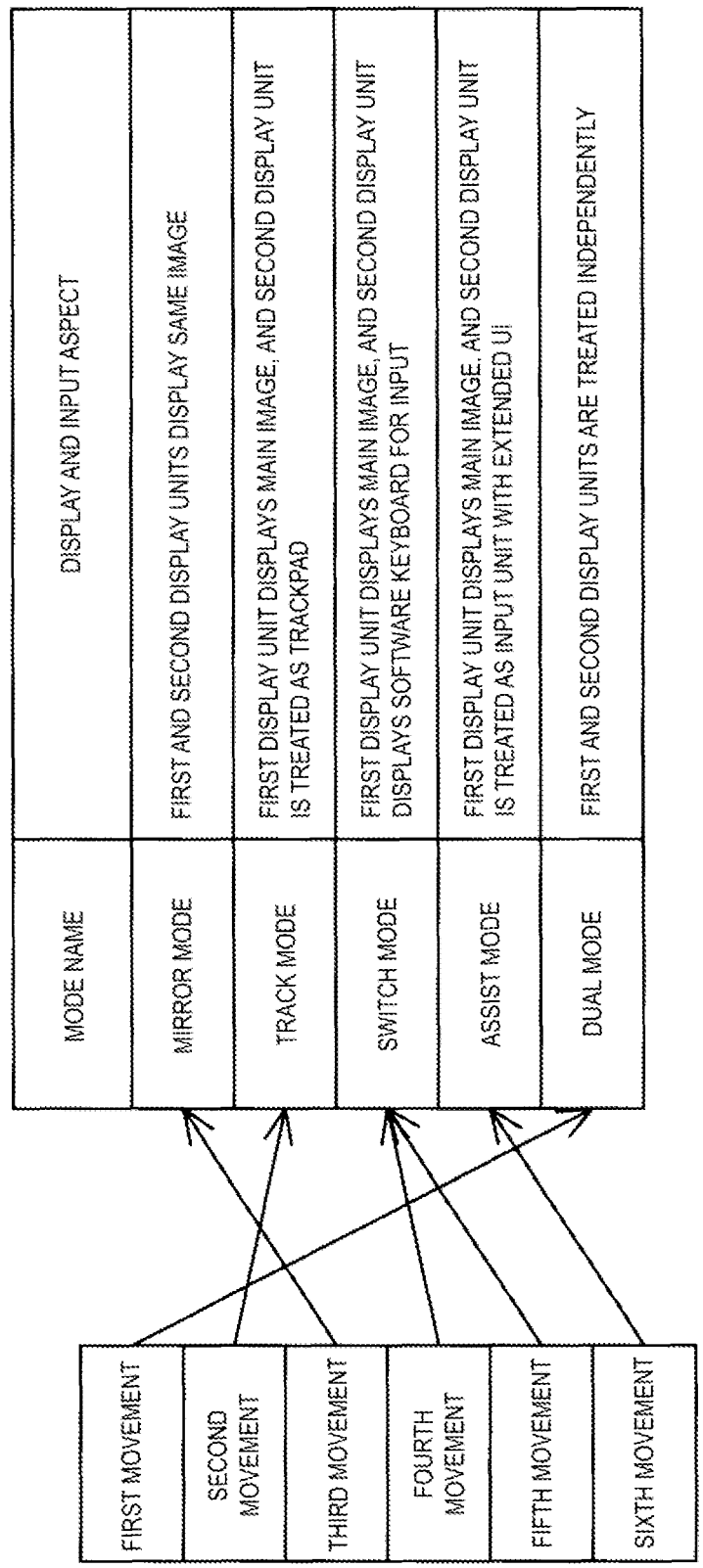
FIG. 7 is an explanatory diagram illustrating relationships between display and input modes of the first and second display units.

As illustrated in FIG. 7, in this embodiment, five types of modes are provided as modes indicating relationships between display and input with respect to the first display unit 200 and the second display unit 73.

<1> Mirror mode: An image displayed on the second display unit 73 is also displayed on the first display unit 200. In other words, this is a mode in which the first display unit 200 and the second display unit 73 display the same image.

<2> Track mode: This is a mode in which the first display unit 200 displays a main image and the second display unit 73 is treated as a trackpad.

<3> Switch mode: This is a mode in which the first display unit 200 displays a main image, and the second display unit 73 displays a software keyboard to input text and the like.

<4> Assist mode: This is a mode in which the first display unit 200 displays a main image, and the second display unit 73 displays an extended UI for input.

<5> Dual mode: This is a mode in which the first display unit 200 and the second display unit 73 are treated independently.

In addition, in the second embodiment, each of these input modes is associated with first to sixth movements of the head of the user as indicated by the line segments. Here, the first to sixth movements are as follows.

First movement (movement of the head facing the right side)
Second movement (movement of the head facing the left side)
Third movement (movement of the head facing downward)
Fourth movement (movement of the head facing upward)
Fifth movement (movement of the head quickly turning to the right)
Sixth movement (movement of the head quickly turning to the left)

With respect to the first to fourth movements, the head is determined as making any of the first to fourth movements when an angle of the head detected by the six-axis sensor 66 is greater than or equal to 40 degrees to the right or left sides and greater than or equal to 15 degrees to the top or bottom from the front side of the head set as 0 degrees in the standard posture. On the other hand, with respect to the fifth and sixth movements, the head is determined as making the fifth or sixth movement when an angle of the head is 40 degrees or less and the acceleration in the left-right direction detected by the six-axis sensor 66 is greater than or equal to a predetermined threshold value. Note that an angle for the determination is not limited to 40 degrees, and can be set as desired, such as 30 degrees.

As in the first embodiment, determination (step S375 in FIG. 4) of whether a movement of the head satisfies the condition for any of the first to sixth movements and display processing (step S400) under each condition are performed in the second embodiment as well. Each of the cases will be described below with reference to the drawings.

Figure 8:
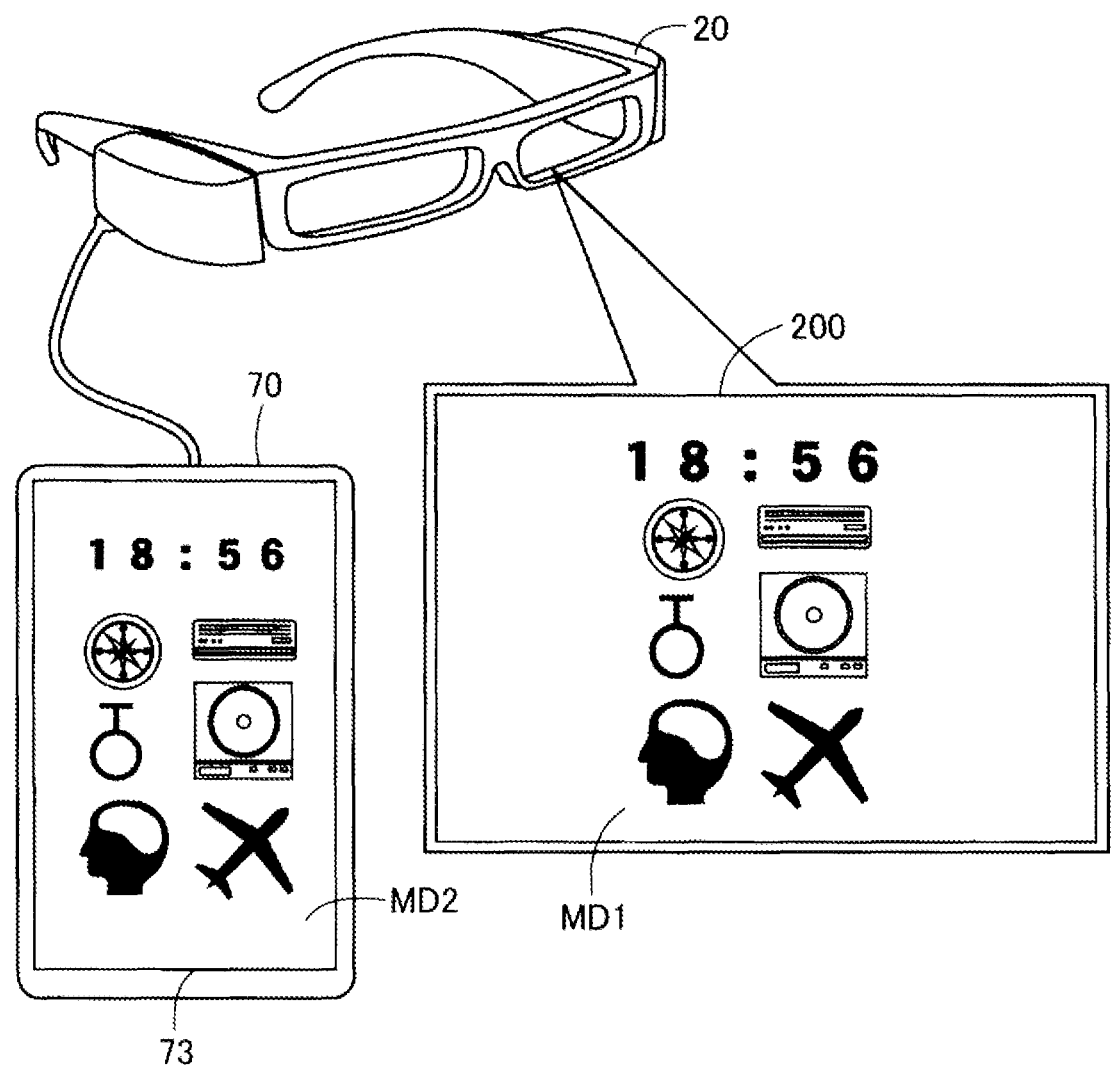
FIG. 8 is an explanatory diagram illustrating an example of display in a mirror mode.

1 Display and Input in Mirror Mode:

In this embodiment, when a movement of the head of the user corresponds to the third movement, as illustrated in FIG. 7, the relationship between display and input with respect to the first display unit 200 and the second display unit 73 is set to the mirror mode. An example of display in the mirror mode is illustrated in FIG. 8. As illustrated in the drawing, in the mirror mode, the same display is displayed on the first display unit 200 as an image MD1 and displayed on the second display unit 73 as an image MD2. Because the same image is displayed on the first display unit 200 and the second display unit 73 in the mirror mode, it is easy for the user to perceive the image MD1 that the user is currently viewing wearing the image display unit 20. In addition, because the same image is displayed on both units, it is easy for the user to continue the work performed wearing the image display unit 20 using the control device 70 even after the user takes off the image display unit 20.

Figure 9:
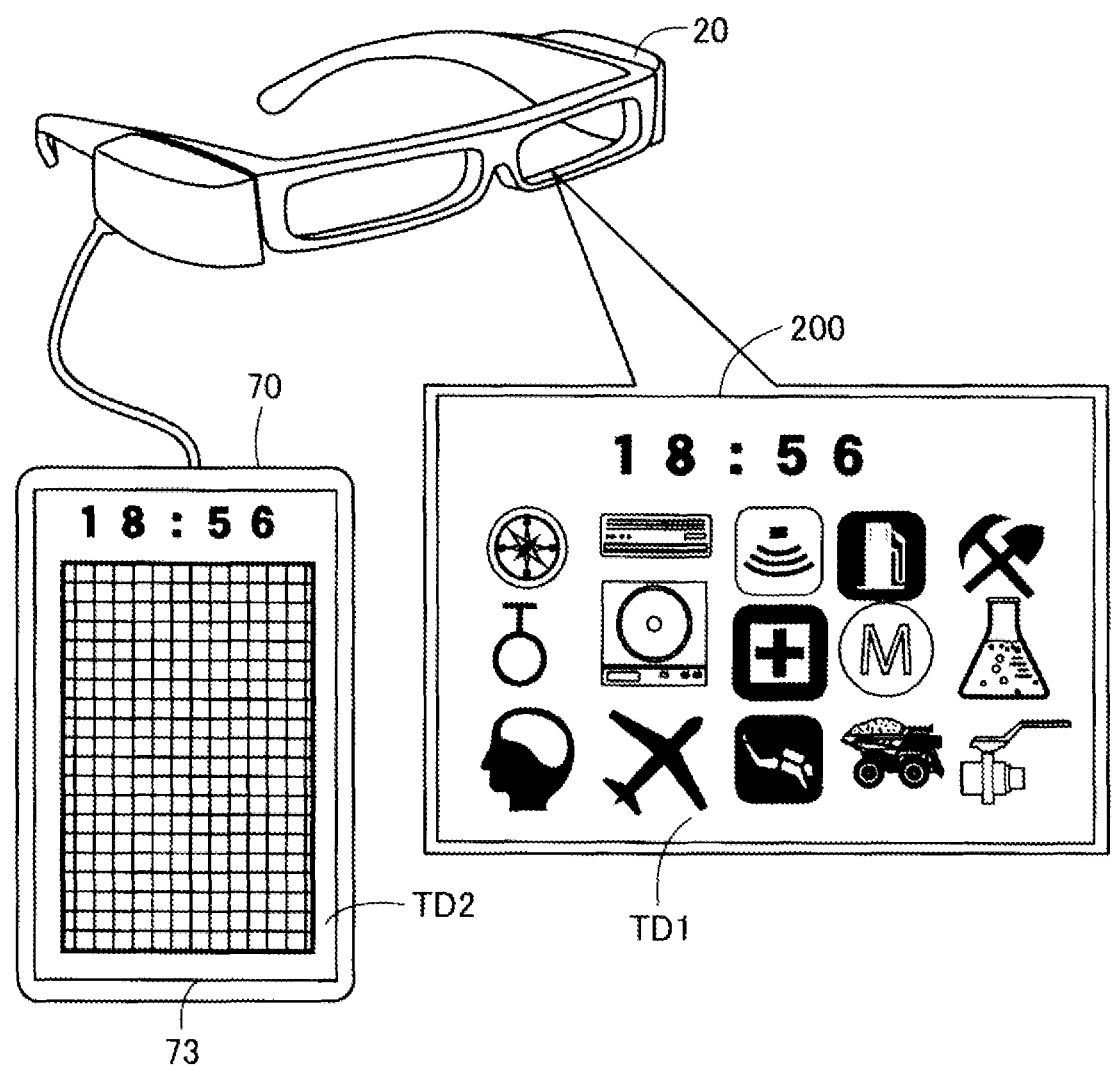
FIG. 9 is an explanatory diagram illustrating an example of display in a track mode.

2 Display and Input in Track Mode:

When a movement of the head of the user corresponds to the second movement as, illustrated in FIG. 7, the relationship between display and input with respect to the first display unit 200 and the second display unit 73 is set to the track mode. An example of display in the track mode is illustrated in FIG. 9. As illustrated in the drawing, a main image TD1 is displayed on the first display unit 200, and a trackpad TD2 is displayed on the second display unit 73 in the track mode. The trackpad TD2 of the second display unit 73 detects a movement of a finger of the user touching the surface by using the function of the touch panel 72. The movement of the finger is used, for example, to select an icon displayed on the first display unit 200. How to handle an input with the trackpad TD2 depends on a setting of a target app 83 being executed at the time of the input. Note that, although the current time is displayed on the second display unit 73 in FIG. 9, the display of the time is the same as that on the first display unit 200. As described above, the first display unit 200 and the second display unit 73 may display specific information. Of course, the second display unit 73 may not perform the same display as the first display unit 200.

Figure 10:
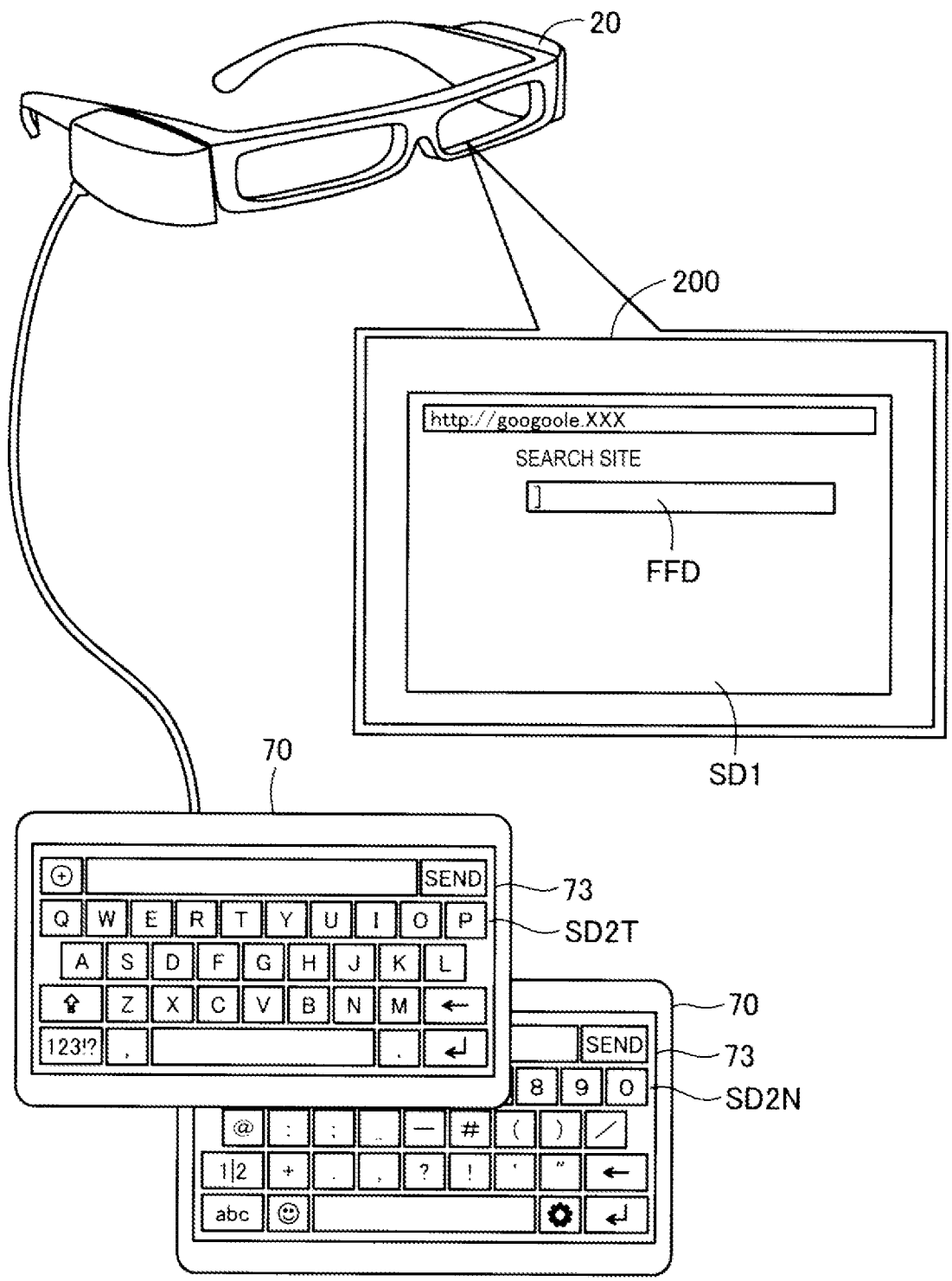
FIG. 10 is an explanatory diagram illustrating an example of display in a switch mode.

3 Display and Input in Switch Mode:

When a movement of the head of the user corresponds to the fourth or fifth movement as illustrated in FIG. 7, the relationship between display and input with respect to the first display unit 200 and the second display unit 73 is set to the switch mode. An example of display in the switch mode is illustrated in FIG. 10. As illustrated in the drawing, a main image SD1 is displayed on the first display unit 200, and a keyboard SD2T or a keyboard SD2N is displayed on the second display unit 73 in the switch mode. The keyboard SD2T or the keyboard SD2N on the second display unit 73 detects the position of a finger of the user touching the surface using the function of the touch panel 72. This movement of the finger is recognized as a specific character in conjunction with the keyboard SD2T or the keyboard SD2N displayed at the time, and is used, for example, to input text into a field FFD for text input displayed in the first display unit 200. How to handle inputs using the keyboard SD2T or keyboard SD2N depends on a setting of the target app 83 being executed at the time of the input. The keyboard SD2T illustrated in FIG. 10 is a keyboard for text input with an alphabet layout, and the keyboard SD2N is a keyboard for numerical and symbol input with a number and symbol layout. Which of the plurality of keyboards is to be displayed is determined depending on a setting of the target app being executed at that time. Of course, the keyboards may be switched between them through the UI app 84. The input event detection unit 82 converts the touch position of the user on the selected keyboard on the second display unit 73 into characters of each key of the keyboard displayed at that time to be input. Thus, the target app 83 can input various kinds of text, numbers, symbols, and the like as needed. Note that a Japanese Kana-Chinese character conversion or the like may be further performed with a front-end processor FEP provided by the OS 81 using a character string input from the keyboard to convert the character string of a mixture of Japanese Kana and Chinese characters and hand over the character string to the target app 83.

Figure 11:
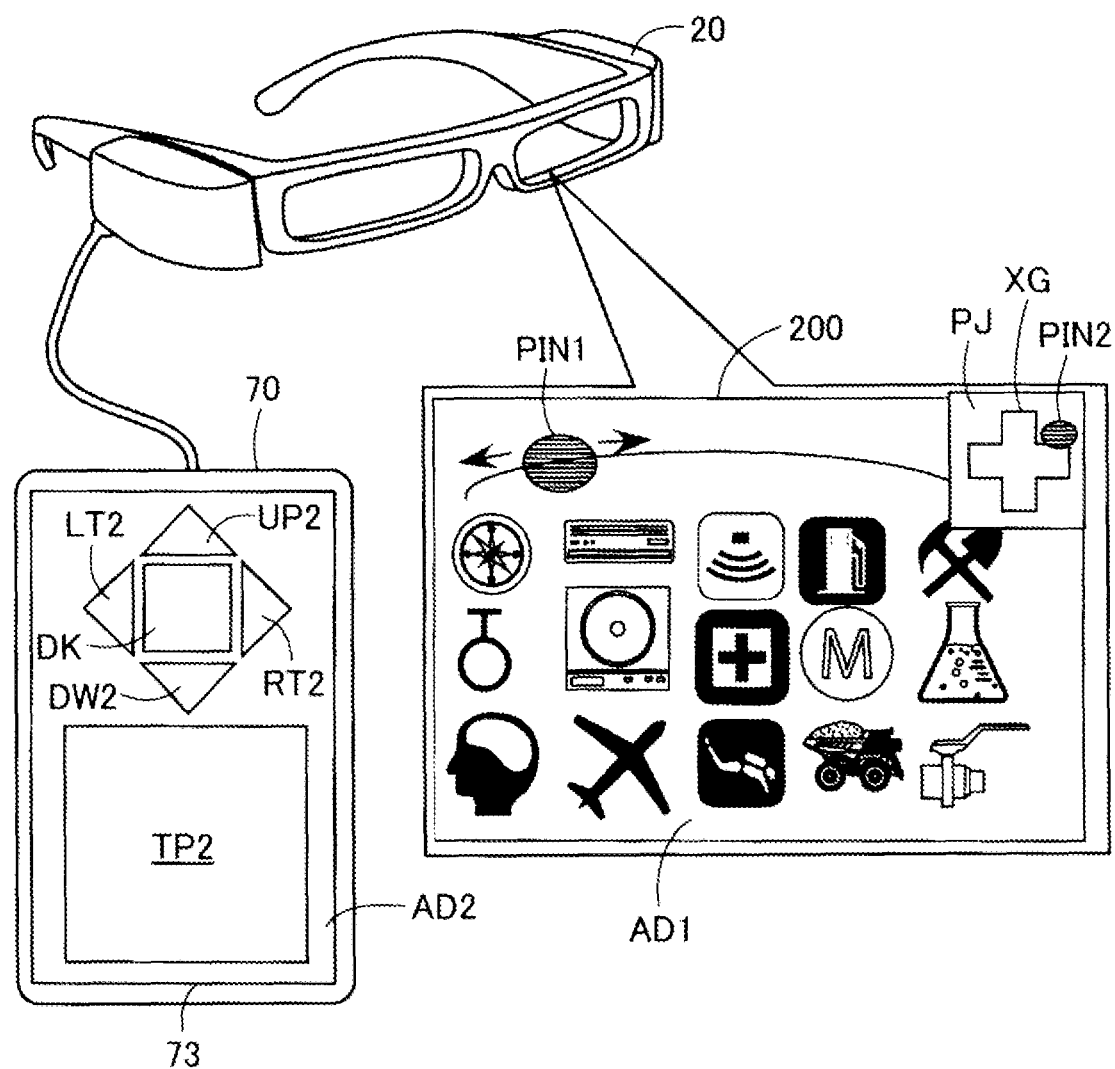
FIG. 11 is an explanatory diagram illustrating an example of display in an assist mode.

4 Display and Input in Assist Mode:

When a movement of the head of the user corresponds to the sixth movement, as illustrated in FIG. 7, the relationship between display and input with respect to the first display unit 200 and the second display unit 73 is set to the assist mode. An example of display in the assist mode is illustrated in FIG. 11. As illustrated in the drawing, a main image AD1 is displayed on the first display unit 200, an input unit AD2 of an extended user interface (hereinafter simply referred to as "extended UI") is displayed on the second display unit 73, and input is performed in the assist mode. A selection circle PIN1 for selecting a necessary input element, here an icon, is displayed on the first display unit 200 along with the main screen. The selection circle PIN1 may be displayed at all times, and may be displayed when the user touches the second display unit.

The input unit AD2 of the second display unit 73 is separated into two parts, and the upper half of the unit displays a confirmation key DK and four arrow keys arrayed around the confirmation key indicating a movement direction including the upward, downward, left, and right directions. The arrow keys include an upward direction key UP2 indicating a movement in the upward direction, a downward direction key DW2 indicating a movement in the downward direction, a right direction key RT2 indicating a movement in the right direction, and a left direction key LT2 indicating a movement in the left direction. In the example illustrated in FIG. 11, a pad navigator PJ is displayed on the first display unit 200 corresponding to the arrow keys displayed on the second display unit 73. The pad navigator PJ includes a cross-cursor XG corresponding to the arrow keys and a contact circle PIN2 indicating a touch position on the cross-cursor. The contact circle PIN2 is displayed when the user touches around the arrow keys of the second display unit 73, and displays a position of the arrow keys displayed on the second display unit 73 touched by the user at present time. Thus, at the time of display in the assist mode, the user can check a movement of his or her fingertip without moving his or her line-of-sight to the control device 70 while the display on the first display unit 200 is overlaid on an outside scene, and can select and operate the arrow keys to move the selection circle PIN1 in the required direction. The second display unit 73 of this embodiment can detect the touch position and strength of the touch as described above, and thus, when the user presses strongly the surface of the second display unit 73 at a particular location, the input event detection unit 82 can detect an event that an arrow key or the confirmation key displayed at the location has been operated, and output the event to the target app 83 via the OS 81.

In addition, a trackpad TP2 is displayed on the lower half of the second display unit 73. The trackpad TP2 of the second display unit 73 uses the function of the touch panel 72 to detect a movement of a finger of the user touching the surface. The movement of the finger is used, for example, to select an icon displayed on the first display unit 200. How to handle an input with the trackpad TP2 depends on a setting of a target app 83 being executed at the time of the input. In the example illustrated in FIG. 11, the selection circle PIN1 corresponding to the cursor moves on the first display unit 200 in response to the movement of the trackpad TP2. At this time, the movement of the selection circle PIN1 may be set to follow the movement of the finger of the user on the second display unit 73, that is, the trajectory of the fingertip of the user touching the trackpad TP2, or the linear movement may be set to be a 3-dimensional movement, for example, an arcuate motion with a large radius as illustrated. Because the user views the real space through the first display unit 200 of the image display unit 20 mounted around his or her head, if the movement of the finger is set as described in the latter case, the user feels as if the movement of the selection circle PIN1 caused the object to be selected in the real space, and it will contribute to the sense of immersion of the user into the reality. In addition, the movement of the selection circle PIN1 on the first display unit 200 is preferably displayed such that the locus remains for a certain period of time, as display on the transmissive first display unit 200.

Figure 12:
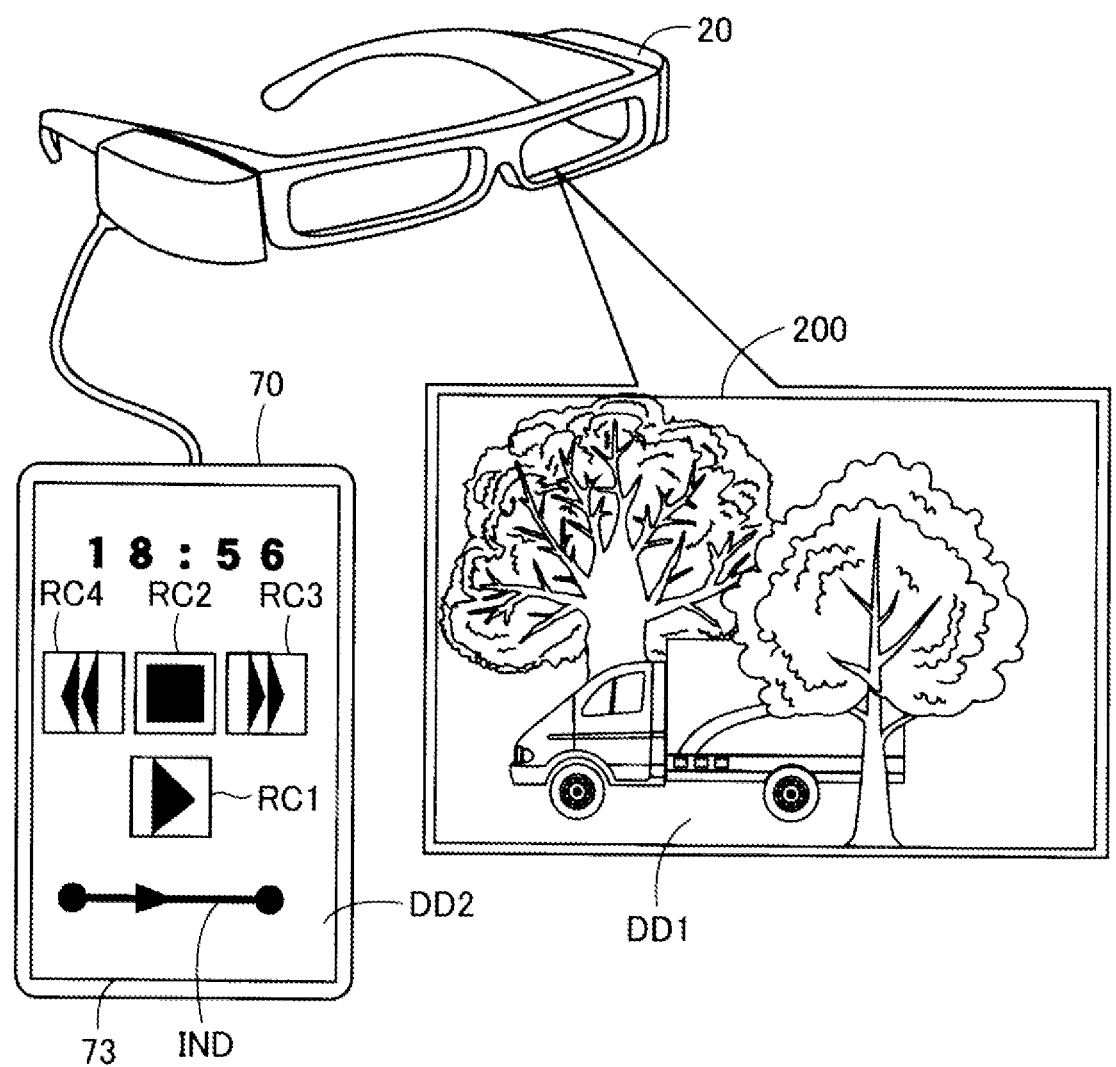
FIG. 12 is an explanatory diagram illustrating an example of display in a dual mode.

5 Display and Input in Dual Mode:

When a movement of the head of the user corresponds to the first movement, as illustrated in FIG. 7, the relationship between display and input with respect to the first display unit 200 and the second display unit 73 is set to the dual mode. An example of display in the dual mode is illustrated in FIG. 12. As illustrated, an image DD1 displayed on the first display unit 200 and an image DD2 displayed on the second display unit 73 are independent in the dual mode. In this example, the image DD1 displayed on the first display unit 200 is an image of a live camera displayed by a browser, which is one of the target apps 83, and the image DD2 displayed on the second display unit 73 is an image of a remote controller displayed by a music player serving as another target app 83 being activated at the same time. The image DD2 includes a play button RC1 indicating playback to the music player, a stop button RC2 indicating a pause of playback, a fast forward/rewinding buttons RC3 and RC4 that allows forwarding and rewinding in a time axis direction, an indicator IND indicating a playback position, and the like.

In the dual mode, the first display unit 200 and the second display unit 73 are entirely independent and two target apps are responsible for display of the units. Thus, an application such as checking images of the live camera while listening to music, or activating a calculator app to perform calculation while playing a game is possible. Of course, common information such as a current time may be displayed in a partial region of the first display unit 200 and the second display unit 73.

According to the second embodiment described above, the same effects as the first embodiment can be achieved, thus the relationship between display and input corresponding to a movement of the head is concluded in advance, the OS 81 supports the concluded relationship, and thus various input modes can be freely combined and used in an application to be executed. To this end, a specific application program may be activated in response to a movement of the head and a specific input mode may be set for each application program, and any of activated application program may switch to a specific input mode and use it according to a movement of the head. For example, FIG. 13 is an explanatory diagram illustrating an example in which various kinds of information are displayed and input is prepared for the display according to a movement of the head in one application program.

As illustrated, when the user takes the standard posture, the first display unit 200 does not display information except that arrows AM are displayed as initial display in the four directions, and the user views an outside scene via the first display unit 200 of the image display unit 20. A screen SG illustrated at the center of FIG. 13 shows a state in which the user attempting to work is looking at a target object OBJ on the desk. On the screen SG, a hand HD of the user is depicted as being in the visual field of the user. This state is the visual field of the user in a standard posture. At this moment, as initial display, the arrows AM indicating the four upward, downward, left, and right directions are displayed on the screen SG. These arrows AM are images that the control device 70 causes the first display unit 200 to display. The arrows AM function as auxiliary display indicating that there is any information in the directions of the arrows. Although the arrows AM are displayed in the upward, downward, left, and right directions because information is provided in all of the four directions in this example, if there is no information in the left direction, for example, arrows AM are displayed in only three directions including upward, downward, and right directions. The initial display may not be provided of course, and may be provided in a different display mode, such as part of the provided information is visible, instead of using arrows.

When the user moves his or her head from the standard posture, the control device 70 acquires the movement of the head based on information from the six-axis sensor 66 provided in the image display unit 20. Although the movement of the head can be in various forms as described above, for example, information created by combining information of the direction in which the head moves among the upward, downward, left, and right directions with the magnitude of the acceleration of the movement can be acquired. Here, as described using FIG. 1 before, the upward, downward, left, and right directions are the upward direction UP in which the user raises the face (head), the downward direction DW in which the user lowers the face, the left side LT to which the user turns his or her face in the left direction, and the right side RT to which the user turns his or her face in the right direction.

Figure 13:
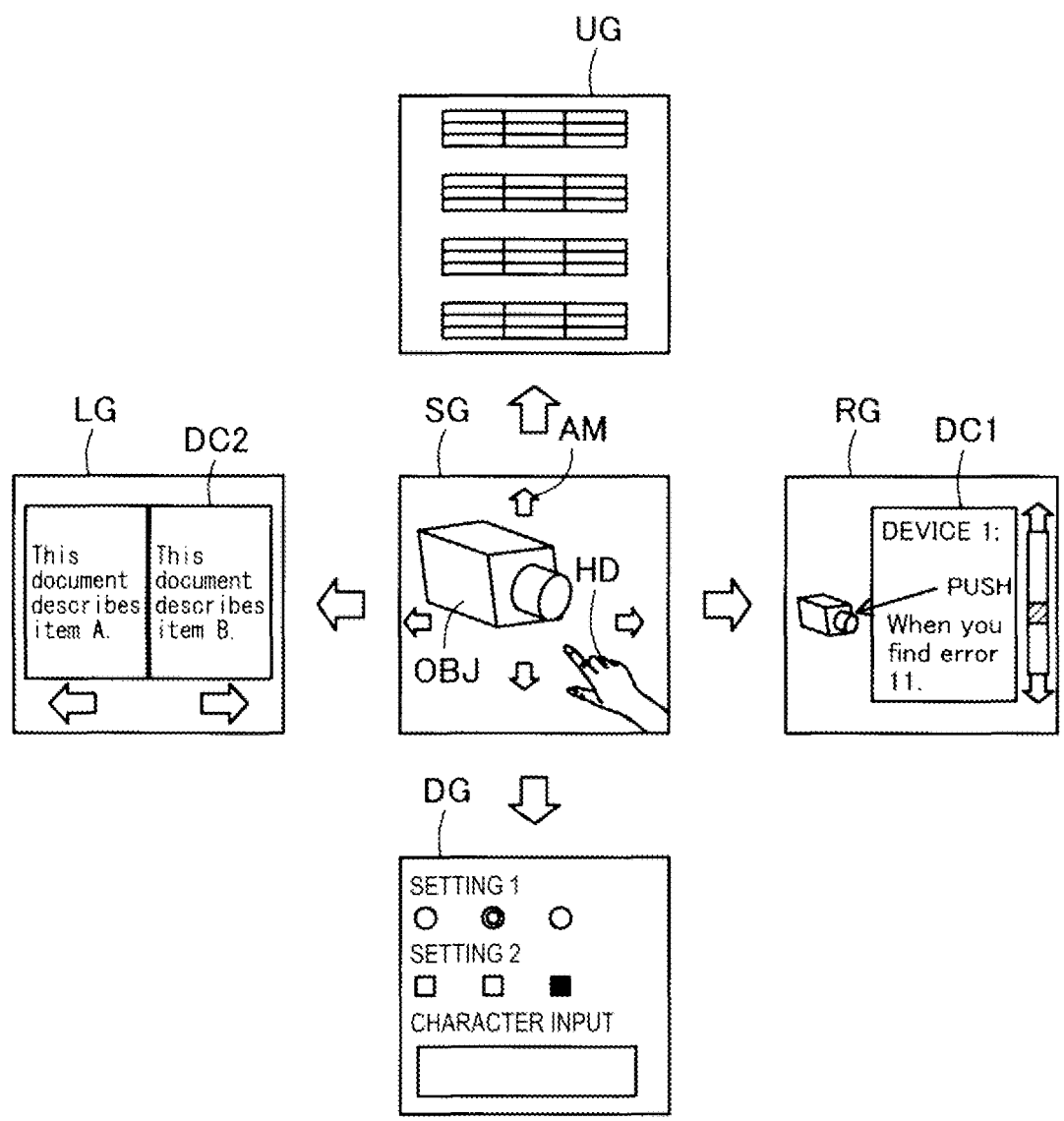
FIG. 13 is an explanatory diagram illustrating virtual display by an image display unit.

When the user of the HMD 100 views the target object OBJ in the standard posture and then turns his or her head to the right side at an acceleration greater than or equal to a predetermined threshold value, the target object OBJ deviates from the center of the visual field, and information DC1, which is one piece of prepared content, is displayed on the first display unit 200 as illustrated in a screen RG of FIG. 13. Thus, the user can refer to the information DC1 displayed in the visual field. In this embodiment, when the user looks to the right side quickly in view from the standard posture, the information DC1 describing an operation method and a handling method for the target object OBJ is displayed. The information DC1 is scrollable as indicated by a scroll bar displayed as auxiliary display in the screen. The operation of the scroll bar is performed using the UI app 84 and the input event detection unit 82. An interface necessary for this processing is displayed on the second display unit 73.

When the user of the HMD 100 views the target object OBJ in the standard posture and then turns his or her head to the left side at an acceleration greater than or equal to a predetermined threshold value, the target object OBJ deviates from the center of the visual field, and information DC2, which is one piece of prepared content, is displayed on the first display unit 200 as illustrated in a screen LG. Thus, the user can refer to the information DC2 displayed in the visual field. In this embodiment, when the user looks at the left side quickly in view from the standard posture, various kinds of the information DC2 on the target object OBJ are displayed. The information DC2 can be referred to back and forth using page flipping buttons displayed as auxiliary display in the screen. The operation of the buttons is performed using the UI app 84 and the input event detection unit 82, similarly to the scroll bar. An interface necessary for this processing is displayed on the second display unit 73.

When the user of the HMD 100 views the target object OBJ in the standard posture and then turns his or her head upward at an acceleration greater than or equal to a predetermined threshold value, the target object OBJ deviates from the center of the visual field, and a screen UG displaying prepared options is displayed on the first display unit 200. The screen UG includes display for assigning a relationship between the direction of the head and the screen as auxiliary display. Using this screen UG, the user can set the display on the HMD 100. The setting of the display refers to what information or screen display is assigned in which direction when viewed in the standard posture. The processing of this case is also performed using the UI app 84 and the input event detection unit 82. An interface necessary for this processing is displayed on the second display unit 73.

When the user of the HMD 100 views the target object OBJ in the standard posture and then turns his or her head downward at an acceleration greater than or equal to a predetermined threshold value, the target object OBJ deviates from the center of the visual field, and a prepared screen DG for performing setting and input is displayed on the first display unit 200. The screen DG displays options to be selected, a field for text input, and the like as auxiliary display. The user can make a setting change, input text, or the like, with reference to the screen DG. The processing of changing the setting and inputting text is also performed using the UI app 84 and the input event detection unit 82. An interface necessary for this processing is displayed on the second display unit 73.

As described above, it is also useful to switch the display and input modes in response to movements of the head of the user in the application program. Note that, a correspondence relationship may be assigned such that the same input mode is selected for a plurality of movements of the head as illustrated in FIG. 7. The number of types of movement of the head is not limited to six, and the number of types does not matter as long as there are a plurality of types. In addition, an input mode different from those illustrated in FIG. 7 may be prepared.

Although the HMD 100 enables outside scenes to be visually recognized as a see-through type in the above-described embodiments, it may be configured as a display device that enables outside scenes to be substantially visually recognized by configuring the first display unit 200 as a non-transmissive display device and displaying outside scenes captured by the video cameras 61R and 61L on the non-transmissive display device.

C. Other Embodiments

The present disclosure can also be implemented in other embodiments described below, in addition to the several embodiments described above.

(1) A first other embodiment is a form as a display system including a head-mounted display device and a controller coupled to the display device. In the display system, the display device includes a first display unit configured to enable an outside scene to be visually recognized, and a display control unit configured to cause the first display unit to perform display in any one of a plurality of modes according to a state of the head of a user wearing the display device, wherein the controller includes a second display unit, an input unit configured to allow input in a plurality of input modes in coordination with display on the second display unit, and an input control unit configured to set an input mode of the input unit in accordance with a mode of the display on the first display unit.

Because the display system sets an input mode of the input unit in accordance with a display mode of the first display unit, in the display system including the first display unit and the second display unit, the input mode is set according to the display mode, and input work according to the display mode is easily performed only with the display system. The head-mounted display device and the controller may be connected using a wire, or may be wirelessly connected using Wi-Fi (registered trademark) or BlueTooth (registered trademark).

(2) In the display system, the input mode may include a data input mode in which at least one of a numerical value, a character, and an image (drawn lines) is input as data, and a selection input mode in which at least one of an input position, an input direction, a selected position, and a selection direction of the selected position is input as information related to a position. In this way, input of data and input of a selection instruction can be performed in a switching manner in accordance with a mode of display. Numbers and characters in the data input mode are not limited to Arabic numerals and alphabets, and may be numbers in various languages (e.g., Chinese numerals, Korean numerals, etc.), and characters in various languages (e.g., Chinese characters, Japanese Kana, Arabic characters, characters with super/subscripts such as umlauts, etc.). The "image (drawn line)" includes a case in which a drawn line can be input as part of text data. In addition, other data, for example, decorative information such as underlines and shades added to characters may be input. Information related to a position in the selection input mode is not limited thereto, and the number of items to be selected may be specified or the order of the item to be selected may be input. In addition, input by the input unit is not limited thereto, a variety of input modes, such as input of sounds or dynamic images may be further included.

(3) In the display system, the input unit is a touch panel disposed to be overlaid on the second display unit, and the input control unit may cause the second display unit to perform display in accordance with the input mode, and may cause a touch on the touch panel to be input to the input unit as information related to the data or the position in accordance with the display on the second display unit. In this way, various input techniques can be realized by simply changing the display of the second display unit. For example, an input unit provided by hardware, such as input with a touch pad (trackpad) or a keyboard, can be replaced by being displayed on the second display unit. Of course, an input unit that is not realized independently by hardware may be provided. In this example, a configuration in which an input unit such as a cross key, a wheel scroll bar, or the like is displayed on the second display unit, and when a user touches near the input unit, the first display unit displays a pad navigator displaying the location near the input unit that the user has touched, and thus touch input via the second display unit is possible even if the user does not view the second display unit is conceivable. In addition, in the above-described embodiment, a configuration in which data input, position selection, or the like is performed in combination with voice input using the microphone 63, combination with detection of a line-of-sight or a movement of the eyelids by the inward-facing camera 62 can be adopted.

(4) In the display system, in the data input mode, at least one of a keyboard for inputting the numerical value or the character, and a trackpad for drawing an image may be displayed on the second display unit to input the data. In this way, it is possible to easily input numerical values, characters, or images.

(5) In the display system, in the information input mode, at least one of a cross key, a wheel key, a joystick, a trackpad, and a mouse may be displayed on the second display unit, and information related to the position may be input through an operation of the touch panel. In this way, because the existing input mechanisms have been simulated, users can easily understand how to use the mechanisms, and information related to a position can be input.

(6) In the display system, a setting unit configured to set, as a standard posture, a specific posture of the head of a user wearing the display device and a detection unit configured to detect a movement of the head of the user wearing the display device may be provided, and display control unit may associate the detected movement of the head with a first mode that is a display mode of the first display unit and a second mode that is different from the first mode, and may cause the first display unit to perform display in the first mode when the detected movement of the head exceeds a predetermined first threshold value and perform display in the second mode when the movement exceeds a second threshold value. In this way, it is possible to easily determine the movement of the head from the standard posture and perform display in any of the first and second modes in accordance with the movement of the head. Note that three or more movements of the head may be determined, and display may be performed in a mode in accordance with the movements.

(7) In the display system, the display control unit may control display of the first display unit in a mode in which visual recognition of the outside scene is prioritized in the standard posture, and in the first mode and the second mode, first information and second information associated in advance with the modes may be displayed on the first display unit. In this way, it is easy to visually recognize an outside scene in the standard posture, and perform work or acquire information while viewing the outside scene, and other information is displayed in another posture, and thus other information can be easily acquired. Although a user wearing the display device of the type in which an outside scene is visually recognized is assumed to perform work or processing while viewing the outside scene, in such a case, workability can be increased as long as the user moves the head from a standard posture and can refer to information related to the work or the like, for example, an operation instruction or a working manual.

(8) In the display system, the first threshold value may be a threshold value for detecting that the head has moved to have a posture for visual recognition in the downward direction from the standard posture, the display control unit may cause the first display unit to display, in the first mode, information for receiving data input as the first information, and the input control unit may cause at least one of a numerical value, a character, and selection of an option to be input in an input mode using the first information. Mostly, there is a hand of the user, a work desk, or the like in the downward direction from the standard posture of the user, and it is natural to put the controller equipped with the second display unit in such a location to perform data input.

(9) In the display system, the second threshold value may be a threshold value for detecting that the head has moved to have a posture for visual recognition in a left or right direction from the standard posture, the display control unit may cause the first display unit to display, in the second mode, predetermined content including at least one of a character, an image, and a video as the second information, and the input control unit may receive input in an input mode to change a display mode of the displayed content. In this way, necessary information can be easily referred to by viewing in the left or right directions from the standard posture, and input for changing the display mode of the information can be accepted to change the display mode.

(10) With respect to the change of the display mode, the display mode of the content to be changed by the input control unit may be specifically at least one of an enlargement/reduction ratio or a display size of the content, a display position of the content, a display range of the content, scrolling of the content, page flipping of the content, and marking on the content.

(11) In the display system, the display control unit may cause the first display unit to display auxiliary display indicating the corresponding input mode in the display of the standard posture, the first mode, and the second mode. The first display unit of the display system can display various kinds of information according to a movement of the head, and auxiliary display can help the user to get a clue of what display is possible due to the movement of the head from the standard posture.

(12) In the display system, the input control unit may notify that the input is possible in one input mode among the plurality of input modes using sound or vibration. Of course, display may be switched without any notification, but if there is a notification using sound or vibration, it can be easily ascertained that the input mode using the second display unit has been switched. Note that switching of an input mode may be displayed on the first display unit in place of or in conjunction with the notification using sound or vibration.

(13) Another embodiment of the present disclosure is in the form of a controller coupled to a head-mounted display device. The controller includes an input display unit configured to provide different display modes depending on input modes, an input unit configured to enable input in a plurality of input modes in coordination with display on the input display unit, and an input control unit that is a transmissive display unit that enables an outside scene to be visually recognized and configured to set an input mode of the input unit in accordance with a display mode of the transmissive display unit provided in the display device. The controller sets an input mode of the input unit in accordance with a display mode of the transmissive display unit provided in the display device, similarly to the display system described above, and thus the input mode can be set in accordance with the display mode of the transmissive display unit of the head-mounted display device, and input work according to the display mode is easily performed using the controller.

(14) Another embodiment of the present disclosure may be a method for controlling a display system including a head-mounted display device and a controller coupled to the display device. In the method for controlling the display system, a first display unit provided in the display device that is a first display unit configured to enable an outside scene to be visually recognized is caused to perform display in any mode of a plurality of modes in accordance with a state of the head of a user wearing the display device, an input mode among the plurality of input modes is set in accordance with the display mode of the first display unit, input corresponding to each of the plurality of input modes is enabled in coordination with display on a second display unit provided in the controller, and input is received in the input mode. Because the input mode is set in accordance with the display mode of the first display unit in the method for controlling the display system, in the display system including the first display unit and the second display unit, the input mode is set according to the display mode, and input work according to the display mode is easily performed only with the display system.

(15) Another embodiment of the present disclosure may be a program that can be executed by a computer to control a display system including a head-mounted display device and a controller coupled to the display device. The program realizes a function to cause a first display unit configured to enable an outside scene to be visually recognized to perform display in any mode of a plurality of modes in accordance with a state of the head of a user wearing the display device, a function to enable input in a plurality of input modes in coordination with display on a second display unit provided in the controller, and a function to set an input mode of the input unit in accordance with the display mode of the first display unit. According to this program, processing using the method for controlling the display system including the above-described head-mounted display device and controller coupled to the display device can be realized.

(16) In each of the above-mentioned embodiments, part of the configuration realized by hardware may be replaced with software. At least part of the configuration realized by software may be realized by discrete circuit configurations. Further, when some or all of the functions of the present disclosure are realized by software, the software (computer program) may be provided in a form stored in a computer-readable recording medium. The "computer-readable recording medium" is not limited to a portable recording medium such as a flexible disk or a CD-ROM, and includes various internal storage devices such as a RAM and a ROM and various external storage devices fixed to a computer such as a hard disk. In other words, the "computer-readable recording medium" has a broad range of definition including any recording medium capable of storing data packets in a fixed manner rather than a non-transitory manner.

The present disclosure is not limited to the embodiments described above, and can be realized in various configurations without departing from the gist of the disclosure. For example, appropriate replacements or combinations may be made to the technical features in the embodiments which correspond to the technical features in the modes described in the Summary to solve some or all of the problems described above or to achieve some or all of the effects described above. In addition, unless the technical features are described herein as essential technical features, such technical features may be deleted appropriately.

What is claimed is:

1. A display system comprising:
   a head-mounted display device configured to be mounted to a head of a user, the head-mounted display device including:
     a first display unit configured to (i) display a first image, a second image that is different from the first image, and a third image that is different from the first image and the second image, and (ii) cause an outside scene to be visually recognizable;
     a detection unit configured to detect (i) whether a movement of the head of the user exceeds a first threshold value in a first direction, (ii) whether the movement of the head of the user exceeds a second threshold value that is different from the first threshold value in a second direction different from the first direction, and (iii) whether the movement of the head of the user exceeds a third threshold value in a third direction that is different from the first direction and the second direction; and
     a display control unit configured to (i) cause the first display unit to display the first image in response to detecting that the movement of the head of the user exceeds the first threshold value in the first direction, (ii) cause the first display unit to display the second image in response to detecting that the movement of the head of the user exceeds the second threshold value in the second direction, and (iii) cause the first display unit to display the third image in response to detecting that the movement of the head of the user exceeds the third threshold value in the third direction; and a controller that is coupled to the head-mounted display device, the controller including:
a second display unit configured to choose between display of the first image that is displayed on the first display unit, a first input image corresponding to an operation mode for operating the second image that is displayed on the first display unit, and a second input image corresponding to an assist mode for assisting the third image that is displayed on the first display unit, the assist mode being a mode in which the second display unit displays the image to extend to the image displayed on the first display unit;
a touch panel overlaid on the second display unit, the touch panel configured to (i) receive an operation of the operation mode when the second display unit displays the first input image, and (ii) receive an operation of the assist mode when the second display unit displays the second input image; and
an input control unit configured to (i) cause the second display unit to display the first image in response to detecting that the movement of the head of the user exceeds the first threshold value in the first direction, (ii) cause the second display unit to display the first input image in response to detecting that the movement of the head of the user exceeds the second threshold value in the second direction, and (iii) cause the second display unit to display the second input image in response to detecting that the movement of the head of the user exceeds the third threshold value in the third direction.

2. The display system according to claim 1, wherein the operation mode includes:
a first input mode that is at least one of a numerical value, a character, and an image or drawn line is input as data, and
a second input mode that is at least one of an input position, an input direction, a selected position, and a selection direction of the selected position is input as information related to a position.

3. The display system according to claim 1, further comprising:
a setting unit configured to set, as a standard posture, a specific posture of the head of the user.

4. The display system according to claim 3, wherein the display control unit is configured to control the first display unit in a mode in which visual recognition of the outside scene is prioritized when the head of the user is in the standard posture.

5. The display system according to claim 4, wherein the first threshold value is a threshold value for detecting the head of the user moving to a downward direction from the standard posture.

6. The display system according to claim 4, wherein the second threshold value is a threshold value for detecting the head of the user moving to a left or up direction from the standard posture.

7. The display system according to claim 2, wherein the input control unit is configured to notify, by sound or vibration, that input is enabled in the first input mode or the second input mode.

8. A method for controlling a display system including a head-mounted display device configured to be mounted to a head of a user and a controller that is coupled to the head-mounted display device, the method comprising:

detecting (i) whether a movement of the head of the user exceeds a first threshold value in a first direction, (ii) whether the movement of the head of the user exceeds a second threshold value that is different from the first threshold value in a second direction different from the first direction, and (iii) whether the movement of the head of the user exceeds a third threshold value in a third direction that is different from each of the first direction and the second direction;

causing a first display unit of the head-mounted display device to display a first image when the movement of the head of the user exceeds the first threshold value in the first direction;

causing a second display unit of the controller to choose between display of the first image when the movement of the head of the user exceeds the first threshold value in the first direction;

causing the first display unit to display a second image when the movement of the head of the user exceeds the second threshold value in the second direction, the second image being different from the first image;

causing the second display unit to display a first input image corresponding to an operation mode for operating the second image when the movement of the head of the user exceeds the second threshold value in the second direction;

causing the first display unit to display a third image when the movement of the head of the user exceeds the third threshold value in the third direction, the third image being different from each of the first image and the second image;

causing the second display unit to display a second input image corresponding to an assist mode for assisting the third image when the movement of the head of the user exceeds the third threshold value in the third direction, the assist mode being a mode in which the second display unit displays the image to extend to the image displayed on the first display unit, the second input image being different from the first input image;

receiving, using a touch panel of the controller, an operation of the operation mode when the second display unit displays the first input image; and receiving, using the touch panel, an operation of the assist mode when the second display unit displays the second input image, wherein the touch panel of the controller is disposed overlaid on the second display unit of the controller.

9. A non-transitory computer readable medium storing a computer executable program configured to control a display system including a head-mounted display device configured to be mounted to a head of a user and a controller that is coupled to the head-mounted display device, the computer executable program comprising:

a function to detect (i) whether a movement of the head of the user exceeds a first threshold value in a first direction, (ii) whether the movement of the head of the user exceeds a second threshold value that is different from the first threshold value in a second direction different from the first direction, and (iii) whether the movement of the head of the user exceeds a third threshold value in a third direction that is different from the first direction and the second direction;

a function to cause a first display unit of the head-mounted display device to display a first image when the movement of the head of the user exceeds the first threshold value in the first direction;

a function to cause a second display unit of the controller to display the first image when the movement of the head of the user exceeds the first threshold value in the first direction;

a function to cause the first display unit to display a second image when the movement of the head of the user exceeds the second threshold value in the second direction, the second image being different from the first image;

a function to cause the second display unit to display a first input image corresponding to an operation mode for operating the second image when the movement of the head of the user exceeds the second threshold value in the second direction;

a function to cause the first display unit to display a third image when the movement of the head of the user exceeds the third threshold value in the third direction, the third image being different from each of the first image and the second image;

a function to cause the second display unit to display a second input image corresponding to an assist mode for assisting the third image when the movement of the head of the user exceeds the third threshold value in the third direction, the assist mode being a mode in which the second display unit displays the image to extend to the image displayed on the first display unit;

a function to receive, using a touch panel of the controller, an operation of the operation mode when the second display unit displays the first input image; and;

a function to receive, using the touch panel, an operation of the assist mode when the second display unit displays the second input image, wherein the touch panel of the controller is disposed overlaid on the second display unit of the controller.

\* \* \* \* \*